(12) United States Patent
Nagaoka

(10) Patent No.: US 6,538,225 B1
(45) Date of Patent: Mar. 25, 2003

(54) COLUMN PACKING AND METHOD FOR MANUFACTURING THE SAME

(76) Inventor: Tadayoshi Nagaoka, 573-2, Oaza Ureshi, Tondabayashi-shi, Osaka-fu (JP)

( * ) Notice: Subject to any disclaimer, the term of this patent is extended or adjusted under 35 U.S.C. 154(b) by 0 days.

(21) Appl. No.: 09/512,410

(22) Filed: Feb. 24, 2000

(30) Foreign Application Priority Data

Mar. 1, 1999 (JP) .......................................... 11-052363

(51) Int. Cl.[7] .............................................. B23K 11/00
(52) U.S. Cl. ........................................................ 219/58
(58) Field of Search ...................... 219/56, 58; 261/94; 55/525, 500

(56) References Cited

U.S. PATENT DOCUMENTS

| | | | | |
|---|---|---|---|---|
| 1,842,121 A | * | 1/1932 | Riley | .......................... 140/112 |
| 1,922,271 A | * | 8/1933 | Southwell et al. | ........... 140/112 |
| 4,116,244 A | * | 9/1978 | Ritter et al. | ................. 140/112 |
| 4,208,284 A | * | 6/1980 | Pretorius et al. | ......... 210/198.2 |
| 5,673,726 A | * | 10/1997 | Nagaoka | ...................... 139/11 |

* cited by examiner

*Primary Examiner*—M. Alexandra Elve
*Assistant Examiner*—Kevin McHenry
(74) *Attorney, Agent, or Firm*—Hedman & Costigan, P.C.

(57) ABSTRACT

First line element made of, e.g., wire and second line elements made of, e.g., wire are disposed so that they cross each other and they are welded together at crossing points to form a net. The net is pressed to form an undulating net. An undulating net of a first layer and an undulating net of a second layer are laid one upon the other in such a manner that crossing points of the undulating net of the first layer alternately come into contact with and are separated from crossing points of the undulating net of the second layer. The crossing points which are in contact with each other are welded together by a welding machine. Subsequently, undulating nets of a third to n-th layers are similarly processed to form a three-dimensional net-like structure.

4 Claims, 21 Drawing Sheets

COLUMN PACKING AND METHOD FOR MANUFACTURING THE SAME

BACKGROUND OF THE INVENTION

This invention relates to a column packing filled in a device which is divided in a plurality of chambers or channels connected to one another and performs material transfer, heat exchange or mixing between gases, liquids or gas and liquid. The invention relates also to a method for manufacturing such column packing.

Japanese Patent Application Laid-open Publication No. Hei 3-203976 discloses a column packing of this type. This column packing a made up of a plurality of permeable sheets which are disposed in parallel to one another and extend in the direction of a main stream of fluid. Projecting portions of these permeable sheets are disposed in the direction that crosses the main stream of fluid and these projections functions as spacers between the adjacent permeable sheets. This packing (hereinafter referred to as "X-packing" because the cross section of a joint portion between two adjacent permeable sheets assumes the shape of the letter X) is beneficial in that fluid flowing down along the permeable sheets is repeatedly joined, mixed, horizontally dispersed and redistributed at each joint of the permeable sheets. Thus fluid flow which was not uniform when it was charged in the device gradually becomes uniform resulting in an optimum material transfer or heat exchange. Moreover, gas charged in the device passes through the liquid flowing along the inclined surfaces of the permeable sheets and necessary contact between the gas and the liquid is achieved by contacting the gas with the liquid while the gas passes through the permeable sheets, so that material transfer or heat exchange can be effected efficiently with a minimum pressure loss.

For manufacturing this X-packing, the inventor of this application proposed the method described in U.S. Pat. No. 5,673,726. According to this method, as shown in FIG. 22, permeable sheets 51 in plural layers and joints 51b of adjacent permeable sheets 51 are simultaneously produced and a three-dimensional woven packing 50 thereby is produced.

In a case where this X-packing manufactured by the above described prior art method is used as a packing loaded in, e.g., a gas-liquid mixing device, the packing 50 of FIG. 22 is erected in the device and liquid from a distributor is caused to flow from the top to the bottom, i.e., in the direction of arrow A. It is, however, actually difficult to maintain the packing 50 strictly horizontally in the device by reason of an error in installation or other causes and, as a result, the threads that run crosswise of the separated portions 51a and the joints 51b of the packing 50 are disposed in a somewhat inclined relationship to the horizontal direction. For this reason, when the operation of the device is started and liquid is caused to flow in the direction of the arrow A, the liquid flows concentrically along a lower portion of the threads that run crosswise with the result that collection, horizontal distribution and downward redistribution of the liquid are not performed uniformly but flow of the liquid tends to concentrate on the lower portion of the inclined threads running crosswise.

It is, therefore, an object of the invention to provide an X-packing capable of accurately achieving uniform collection and redistribution of liquid at joints of the X-packing.

It is another object of the invention to provide a method for manufacturing such X-packing at a low cost and in a large scale.

SUMMARY OF THE INVENTION

For achieving these objects of the invention, there is provided a method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being formed by conversion and dispersion of four line elements, said method comprising steps of:

(A) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and the first and second line elements are laid one upon the other;

(B) fixing the first line elements to the second line elements at crossing points thereof and thereby forming a net;

(C) pressing the net to form a plurality of parallel undulating bulging portions which bulge at alternate ones of the crossing points continuously formed in the first direction and the second direction and thereby forming an undulating net;

(D) laying a second layer of the undulating net upon a first layer of the undulating net in such a manner that the crossing points continuously formed in the first direction and the second direction of the first layer of the undulating net alternately come into contact with and separate from the crossing points continuously formed in the first direction and the second direction of the second layer of the undulating net and thereafter fixing together the crossing points of the first layer of the undulating net and the second layer of the undulating net which are in contact with each other; and (E) laying a third layer of the undulating net upon the second layer of the undulating net in such a manner that the crossing points continuously formed in the first direction and the second direction of the second layer of the undulating net alternately come into contact with and separate from the crossing points continuously formed in the first direction and the second direction of the third layer of the undulating net and thereafter fixing together the crossing points of the second layer of the undulating net and the third layer of the undulating net which are in contact with each other; and thereafter superposing a fourth, a fifth . . . and n-th (n being any integer) layer of the undulating nets in the same manner and fixing together the crossing points of the respective layers of the undulating nets and the immediately lower layers of the undulating nets which are in contact with each other.

According to the manufacturing method, a packing 1 as shown in the schematic perspective view of FIG. 1 can be obtained. This packing 1 has, as shown in the partial perspective view of FIG. 2, has a unit structure 2 which is a combination of two quadruple pyramids which as a common base and apexes which are directed in the opposite directions. The three-dimensional net-like structure is formed by disposing a plurality of the unit structures 2 in vertical and horizontal directions. As will be apparent from FIG. 2, in this unit structure 2, four line elements 3 constitute four sides of the respective quadruple pyramids and respective apexes 2a of the two quadruple pyramids and joints 2b of the two quadruple pyramids are formed by conversion and dispersion of four line elements. Accordingly, no element corresponding to the horizontal threads in the prior art X-packing is used at all in this unit structure 2.

Accordingly, by using the packing 1 manufactured by the method of the invention in a device such as a gas-liquid contact device, liquid from a distributor flows in the direction of arrow B in FIG. 1 and, since no element corresponding to the horizontal threads is used in the packing 1, the liquid which has fallen upon the top of the packing 1 does not produce a drift which is caused by flow of the liquid toward a laterally lower portion even if there is an error in installing the packing 1 in the device and, therefore, collection and downward redistribution of the liquid at the two vertical apexes 2a and joints 2b of the two quadruple pyramids of the unit structure 2 are performed uniformly.

For achieving the objects of the invention, there is also provided a method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being formed by conversion and dispersion of three line elements, said method comprising:

(A) a step of forming a first undulating net comprising the following steps (a), (b) and (c):
- (a) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and are superposed one upon the other;
- (b) fixing the first line elements to the second line elements at crossing points thereof and thereby forming a net; and
- (c) pressing the net to form a plurality of parallel undulating bulging portions and thereby forming a first undulating net in such a manner that one of the crossing points continuously formed in the first direction and the second direction constitutes a crossing point of the lowest level in forming of a unit three-dimensional net-like structure, a crossing point adjacent to the crossing point of the lowest level constitutes a crossing point of a lower side middle level in forming of the unit three-dimensional net-like structure, a crossing point adjacent to the crossing point of the lower side middle level constitutes a crossing point of an upper side middle level in forming of the unit three-dimensional net-like structure, a crossing point adjacent to the crossing point of the upper side middle level constitutes a crossing point of the lower side middle level in forming of the unit three-dimensional net-like structure, a crossing point adjacent to the crossing point of the lower side middle level constitutes a crossing point of the lowest level in forming of the unit three-dimensional net-like structure, and subsequent crossing points constitute crossing points of the respective levels in the above cycle in forming of the unit three-dimensional net-like structure;

(B) a step of forming a second undulating net comprising the following steps (a), (b) and (c):
- (a) disposing
  - first line elements extending in parallel at a predetermined interval in the first direction on a plane, bending at a position corresponding to one of the crossing points of the lower side middle level of the first undulating net at a predetermined angle and extending in a third direction, bending at a position corresponding to the next lower side middle point of the first undulating net at the predetermined angle and extending in the second direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the first direction, the third direction, the second direction and the third direction, and
  - second line elements extending in parallel at a predetermined interval in the second direction on the plane, bending at a position corresponding to one of the crossing points of the lower side middle level of the first undulating net at a predetermined angle and extending in the third direction, bending at a position corresponding to the next lower side middle point of the first undulating net at the predetermined angle and extending in the first direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the second direction, the third direction, the first direction and the third direction
  in such a manner that the first line elements and the second line elements cross each other at the desired angle in their portions extending in the first or second direction at positions corresponding to the crossing points of the upper side middle level of the first undulating net and extend jointly one being laid upon the other in their portions extending in the third direction;
- (b) fixing the first line elements to the second line elements at the respective crossing points thereof and also at joining points and separating points of their portions extending in the third direction and thereby forming a net; and
- (c) pressing the net to form a plurality of parallel undulating bulging portions which bulge at the respective crossing points and also at middle positions of the portions extending in the third direction and thereby constitute the upper side middle level in forming of the unit three-dimensional net-like structure, and thereby forming a second undulating net;

(C) a step of forming a third undulating net comprising the following steps (a), (b) and (c):
- (a) disposing
  - first line elements extending in parallel at a predetermined interval in the third direction on a plane, bending at a position corresponding to one of the crossing points of the lower side middle level of the first undulating net at a predetermined angle and extending in the second direction, bending at a position corresponding to the next lower side middle point of the first undulating net at the predetermined angle and extending in the third direction again, bending at a position corresponding to the next lower side middle level of the first undulating net at the predetermined angle and extending in the first direction, and bending at a position corresponding to the next lower side middle level of the first undulating net at the predetermined angle and repeating the cycle of extending in the third direction, the second direction, the third direction and the first direction, and second line elements extending in parallel at a predetermined interval in the third direction on the plane, bending at a position corresponding to one of the crossing points of the lower side middle level of the first undulating net at a predetermined angle and extending in the first direction, bending at a position corresponding to the next lower side middle point of the first undulating net at the predetermined angle and extending in the third direction again, bending at a position corresponding to the next lower side middle level of the first undulating net at the predetermined angle and extending in the second direction, and bending at a position corresponding to the next lower side middle level of the first undulating net at the predetermined angle and repeating the cycle of extending in the third direction, first direction, the third direction and the second direction in such a manner that the first line elements and the second line elements cross each other at the desired angle in their portions extending in the first or second direction at positions corresponding to middle positions of the portions extending in the third direction of the second undulating net and extend jointly one being laid upon the other in their portions extending in the third direction;

(b) fixing the first line elements to the second line elements at the crossing points thereof and also at joining points and separating points of their portions extending in the third direction and thereby forming a net; and (c) pressing the net to form a plurality of parallel undulating bulging portions which bulge at the respective joining and separating points of the portions extending in the third direction and thereby constitute the highest level in forming of the unit three-dimensional net-like structure, and thereby forming a third undulating net;

(D) a step of laying the second undulating net upon the first undulating net in such a manner that the crossing points of the second undulating net come into contact with the crossing points of the upper middle level of the first undulating net, the joining points and the separating points of the portions extending in the third direction of the second undulating net come into contact with the crossing points of the lower middle level of the first undulating net, and the undulating bulging portions at the middle positions of the portions extending in the third direction of the second undulating net are separated from the crossing points of the lowest level of the first undulating net and form the upper middle level of the unit three-dimensional net-like structure;

(E) a step of laying the third undulating net upon the second undulating net in such a manner that the crossing points of the third undulating net come into contact with the undulating bulging portions at the middle positions of the portions extending in the third direction of the second undulating net, the portions extending in the third direction of the third undulating net come into contact, at their middle positions, with the crossing points of the second undulating net, and the undulating bulging portions at the joining points and the separating points of the portions extending in the third direction of the third undulating net are separated from the second undulating net and form the highest level of the unit three-dimensional net-like structure; and (F) a step of fixing the first undulating net, the second undulating net and the third undulating net together at necessary points among points of contact thereof.

According to this manufacturing method, a packing 30 as shown in the schematic perspective view of FIG. 3 can be obtained. This packing 30 has, as shown in the partial perspective view of FIG. 4, a unit structure 32 which is a combination of three triangular pyramids 33 each having an apex 33a and three sides 33b and three triangular pyramids 34 each having an apex 34a directed in the opposite direction to the apex 33a and three sides 34b. The three-dimensional net-like structure is formed by disposing a plurality of the unit structures 32 in vertical and horizontal directions.

In the unit structure 32, the respective sides 33b and 34b are formed with line elements. More specifically, three line elements constitute the three sides 33b and 34b of the triangular pyramids 33 and 34 and the apexes 33a and 34a of the respective triangular pyramids and joints 35 of the sides of the respective triangular pyramids are formed by conversion and dispersion of three line elements. In this unit structure 32 either, no element corresponding to the horizontal threads is provided at all and, therefore, the same effect as the one described above with respect to the unit structure 2 can be achieved. That is, liquid flows in the direction of arrow C in FIG. 3 and collection and downward redistribution of the liquid at the apexes 33a and 34a and the joints 35 of the triangular pyramids 33 and 34 of the unit structure 32 are performed uniformly.

The present invention can be applied not only to the colum packing used in devices such as a gas-liquid mixing device but also to manufactring of other three-dimensional net-like structure such as ones used for a mist eliminator, a multi-layer filtering film and aggregate.

In one aspect of the invention, there is provided a method for manufacturing a three-dimensional net-like structure including a mist eliminator and a multi-layer filtering film formed by conversion and dispersion of four line elements, said method comprising steps of:

(A) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and the first and second line elements are laid one upon the other;

(B) fixing the first line elements to the second line elements at crossing points thereof and thereby forming a net;

(C) pressing the net to form a plurality of parallel undulating bulging portions which bulge at alternate ones of the crossing points continuously formed in the first direction and the second direction and thereby forming an undulating net;

(D) laying a second layer of the undulating net upon a first layer of the undulating net in such a manner that the crossing points continuously formed in the first direction and the second direction of the first layer of the undulating net alternately come into contact with and separate from the crossing points continuously formed in the first direction and the second direction of the second layer of the undulating net and thereafter fixing together the crossing points of the first layer of the undulating net and the second layer of the undulating net which are in contact with each other; and (E) laying a third layer of the undulating net upon the second layer of the undulating net in such a manner that the crossing points continuously formed in the first direction and the second direction of the second layer of the undulating net alternately come into contact with and separate from the crossing points continuously formed in the first direction and the second direction of the third layer of the undulating net and thereafter fixing together the crossing points of the second layer of the undulating net and the third layer of the undulating net which are in contact with each other; and thereafter superposing a fourth, a fifth . . . and n-th (n being any integer) layer of the undulating nets in the same manner and fixing together the crossing points of the respective layers of the undulating nets and the immediately lower layers of the undulating nets which are in contact with each other.

In another aspect of the invention, there is provided a method for manufacturing a three-dimensional net-like structure including a mist eliminator and a multi-layer filtering film formed by conversion and dispersion of three line elements, said method comprising:

(A) a step of forming a first undulating net comprising the following steps (a), (b) and (c):
 (a) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and are superposed one upon the other;
 (b) fixing the first line elements to the second line elements at crossing points thereof and thereby forming a net; and
 (c) pressing the net to form a plurality of parallel undulating bulging portions and thereby forming a first undulating net in such a manner that one of the crossing points continuously formed in the first direction and the second direction constitutes a crossing point of the lowest level in forming of a unit three-dimensional net-like structure, a crossing point adjacent to the crossing point of the lowest level constitutes a crossing point of a lower side middle level in forming of the unit three-dimensional net-like structure, a crossing point adjacent to the crossing point of the lower side middle level constitutes a crossing point of an upper side middle level in forming of the unit three-dimensional net-like structure, a crossing point adjacent to the crossing point of the upper side middle level constitutes a crossing point of the lower side middle level in forming of the unit three-dimensional net-like structure, a crossing point adjacent to the crossing point of the lower side middle level constitutes a crossing point of the lowest level in forming of the unit three-dimensional net-like strucuture, and subsequent crossing points constitute crossing points of the respective levels in the above cycle in forming of the unit three-dimensional net-like structure;

(B) a step of forming a second undulating net comprising the following steps (a), (b) and (c):
 (a) disposing
  first line elements extending in parallel at a predetermined interval in the first direction on a plane, bending at a position corresponding to one of the crossing points of the lower side middle level of the first undulating net at a predetermined angle and extending in a third direction, bending at a position corresponding to the next lower side middle point of the first undulating net at the predetermined angle and extending in the second direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the first direction, the third direction, the second direction and the third direction, and
  second line elements extending in parallel at a predetermined interval in the second direction on the plane, bending at a position corresponding to one of the crossing points of the lower side middle level of the first undulating net at a predetermined angle and extending in the third direction, bending at a position corresponding to the next lower side middle point of the first undulating net at the predetermined angle and extending in the first direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the second direction, the third direction, the first direction and the third direction
  in such a manner that the first line elements and the second line elements cross each other at the desired angle in their portions extending in the first or second direction at positions corresponding to the crossing points of the upper side middle level of the first undulating net and extend jointly one being laid upon the other in their portions extending in the third direction;
 (b) fixing the first line elements to the second line elements at the respective crossing points thereof and also at joining points and separating points of their portions extending in the third direction and thereby forming a net; and
 (c) pressing the net to form a plurality of parallel undulating bulging portions which bulge at the respective crossing points and also at middle positions of the portions extending in the third direction and thereby constitute the upper side middle level in forming of the unit three-dimensional net-like structure, and thereby forming a second undulating net;

(C) a step of forming a third undulating net comprising the following steps (a), (b) and (c):
(a) disposing
first line elements extending in parallel at a predetermined interval in the third direction on a plane, bending at a position corresponding to one of the crossing points of the lower side middle level of the first undulating net at a predetermined angle and extending in the second direction, bending at a position corresponding to the next lower side middle point of the first undulating net at the predetermined angle and extending in the third direction again, bending at a position corresponding to the next lower side middle level of the first undulating net at the predetermined angle and extending in the first direction, and bending at a position corresponding to the next lower side middle level of the first undulating net at the predetermined angle and repeating the cycle of extending in the third direction, the second direction, the third direction and the first direction, and
second line elements extending in parallel at a predetermined interval in the third direction on the plane, bending at a position corresponding to one of the crossing points of the lower side middle level of the first undulating net at a predetermined angle and extending in the first direction, bending at a position corresponding to the next lower side middle point of the first undulating net at the predetermined angle and extending in the third direction again, bending at a position corresponding to the next lower side middle level of the first undulating net at the predetermined angle and extending in the second direction, and bending at a position corresponding to the next lower side middle level of the first undulating net at the predetermined angle and repeating the cycle of extending in the third direction, first direction, the third direction and the second direction
in such a manner that the first line elements and the second line elements cross each other at the desired angle in their portions extending in the first or second direction at positions corresponding to middle positions of the portions extending in the third direction of the second undulating net and extend jointly one being laid upon the other in their portions extending in the third direction;
(b) fixing the first line elements to the second line elements at the crossing points thereof and also at joining points and separating points of their portions extending in the third direction and thereby forming a net; and
(c) pressing the net to form a plurality of parallel undulating bulging portions which bulge at the respective joining and separating points of the portions extending in the third direction and thereby constitute the highest level in forming of the unit three-dimensional net-like structure, and thereby forming a third undulating net;
(D) a step of laying the second undulating net upon the first undulating net in such a manner that the crossing points of the second undulating net come into contact with the crossing points of the upper middle level of the first undulating net, the joining points and the separating points of the portions extending in the third direction of the second undulating net come into contact with the crossing points of the lower middle level of the first undulating net, and the undulating bulging portions at the middle positions of the portions extending in the third direction of the second undulating net are separated from the crossing points of the lowest level of the first undulating net and form the upper middle level of the unit three-dimensional net-like structure;
(E) a step of laying the third undulating net upon the second undulating net in such a manner that the crossing points of the third undulating net come into contact with the undulating bulging portions at the middle positions of the portions extending in the third direction of the second undulating net, the portions extending in the third direction of the third undulating net come into contact, at their middle positions, with the crossing points of the second undulating net, and the undulating bulging portions at the joining points and the separating points of the portions extending in the third direction of the third undulating net are separated from the second undulating net and form the highest level of the unit three-dimensional net-like structure; and
(F) a step of fixing the first undulating net, the second undulating net and the third undulating net together at necessary points among points of contact thereof.

In another aspect of the invention, there is provided a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being formed by conversion and dispersion of four line elements wherein a converging portion of the four line elements is formed by mutual contact of undulating nets having parallel undulating bulging portions at necessary portions.

In another aspect of the invention, there is provided a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being formed by conversion and dispersion of three line elements wherein a converging portion of the three line elements is formed by mutual contact of undulating nets having parallel undulating bulging portions at necessary portions.

In another aspect of the invention, there is provided a three-dimensional net-like structure including a mist eliminator and a multi-layer filtering film formed by conversion and dispersion of four line elements wherein a converging portion of the four line elements is formed by mutual contact of undulating nets having parallel undulating bulging portions at necessary portions.

In still another aspect of the invention, there is provided a three-dimensional net-like structure including a mist eliminator and a multi-layer filtering film formed by conversion and dispersion of three line elements wherein a converging portion of the three line elements is formed by mutual contact of undulating nets having parallel undulating bulging portions at necessary portions.

Preferred embodiments of the invention will be described below with reference to the accompanying drawings.

BRIEF DESCRIPTION OF THE DRAWINGS

In the accompanying drawings,

FIGS. 20A and 20B show laying of the second undulating net on the first undulating net in the second embodiment in which FIG. 20A is a front view of the undulating nets and FIG. 20B is a side view of the undulating nets;

FIGS. 21A to 20C show laying of the third undulating net on the first and second undulating nets in the second embodiment in which FIG. 21A is a front view of the nets.

DESCRIPTION OF PREFERRED EMBODIMENTS

Embodiment 1

Figure 1:
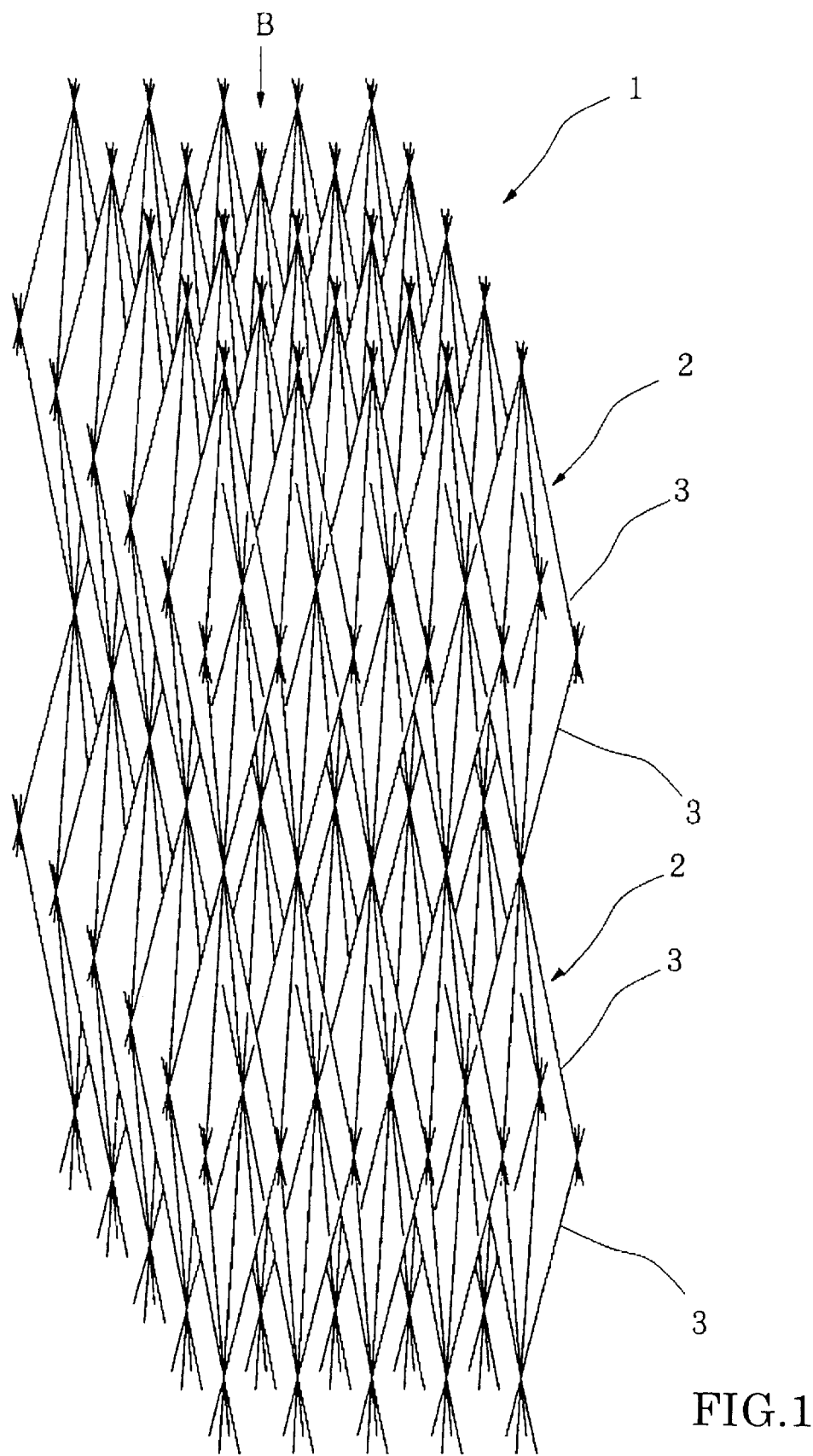
FIG. 1 is a schematic perspective view showing an example of the three-dimensional net-like structure of the invention.
Figure 2:
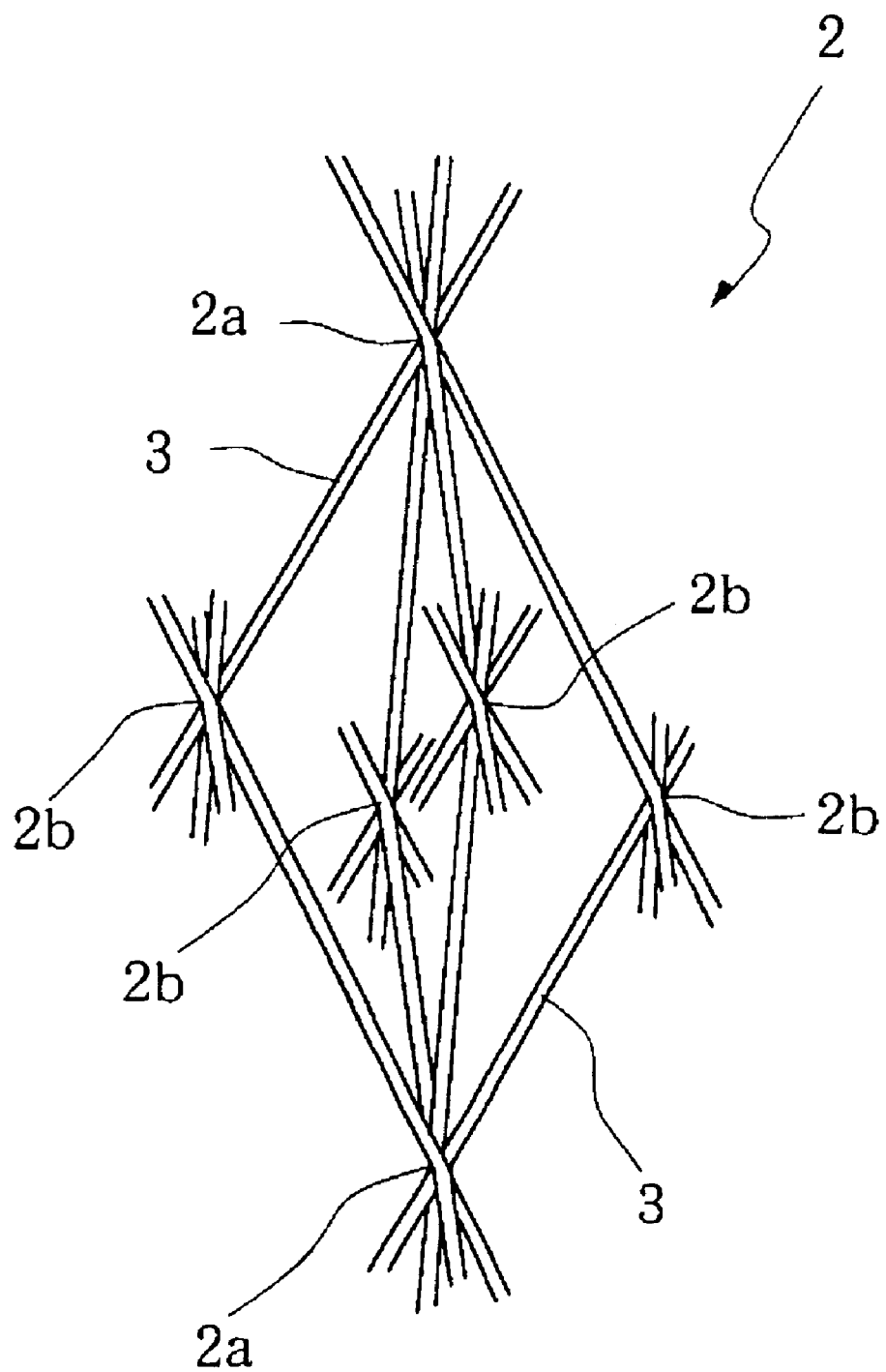
FIG. 2 is a perspective view showing a unit structure of the example.

This embodiment relates to a method for manufacturing the three-dimensional net-like structure shown in FIGS. 1 and 2.

(1) Step of Disposing Line Elements

A line element used in the manufacturing method of the invention may be made of metal or plastic. There is no particular limitation in the material used for the line element and wire, twine or monofilament may be used as the line element. Since the line element is formed to an undulating net by pressing, the material for the line element must be capable of plastic deformation and have sufficient rigidity to maintain the undulating shape after pressing.

The line element may be made of a monofilament or a single piece of wire but a line element made of wire or twine which is made by twisting thin steel lines or plastic lines is preferable because liquid flows along the space between the lines which constitute the wire or twine due to the capillary action and thereby enhance transfer of the liquid. In the present embodiment, seven steel lines each having a diameter of 0.1 mm are twisted together to form a single steel wire and two of this steel wire are further twisted to a single wire and this wire is used as the line element 3.

Figure 5:
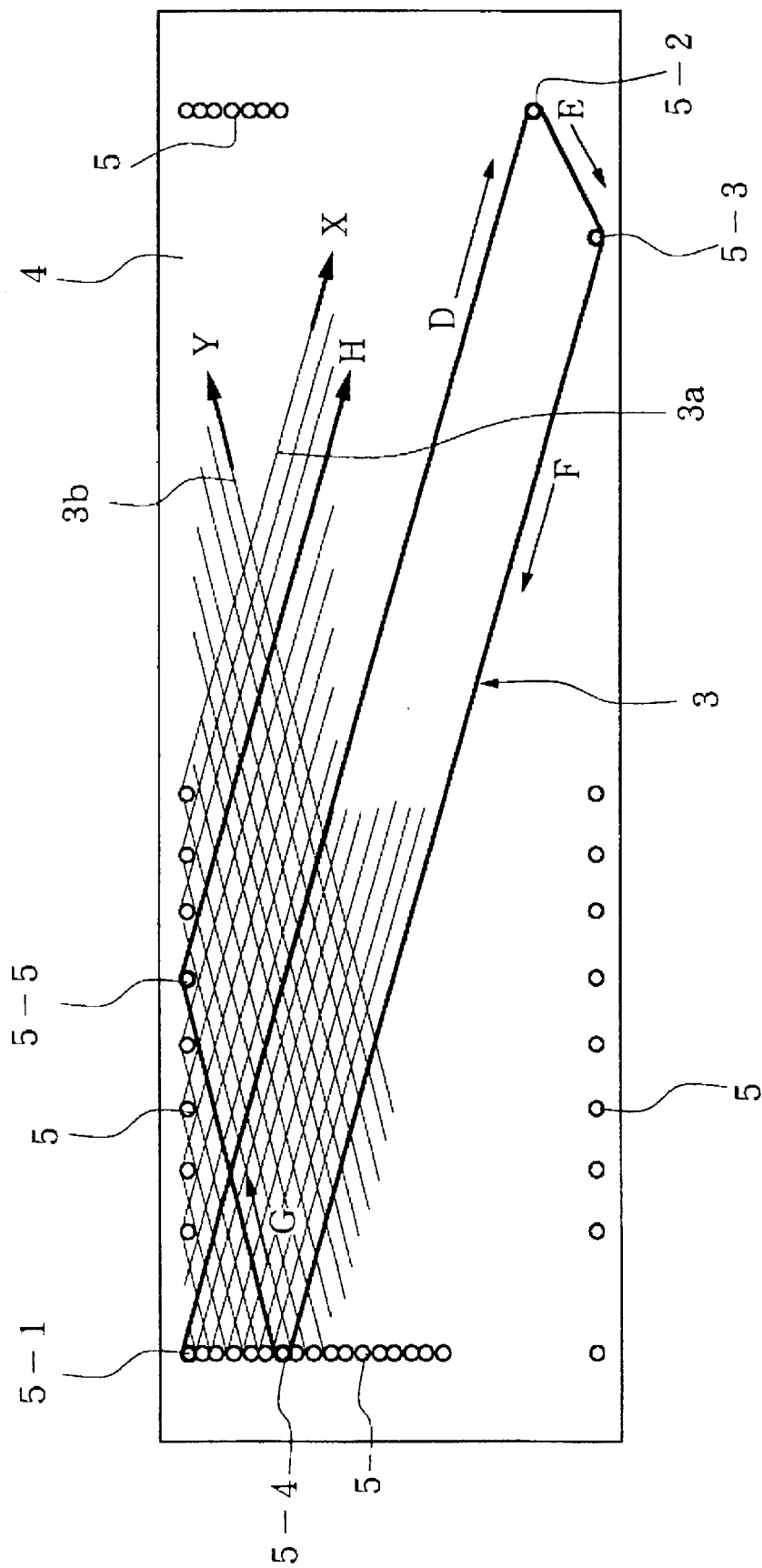
FIG. 5 is a plan view showing an example of a line element placing table.

This line element 3 is disposed on a line element placing table 4 shown in the plan view of FIG. 5. In the plan view, line element engaging pins 5 are provided at a predetermined interval in the four edge portions of the line element placing table 4. The line element 3 wound about a drum (not shown) is unwound from the drum and, as shown in FIG. 5 by way of example, is guided by a pin 5-1 provided in the left upper corner as viewed in FIG. 5 and thereafter is disposed over the entire surface of the line elements placing table 4, guided by pins 5-2, 5-3, 5-4, 5-5 and so on and extending in the order of arrows D, E, F, G etc.

Figure 6:
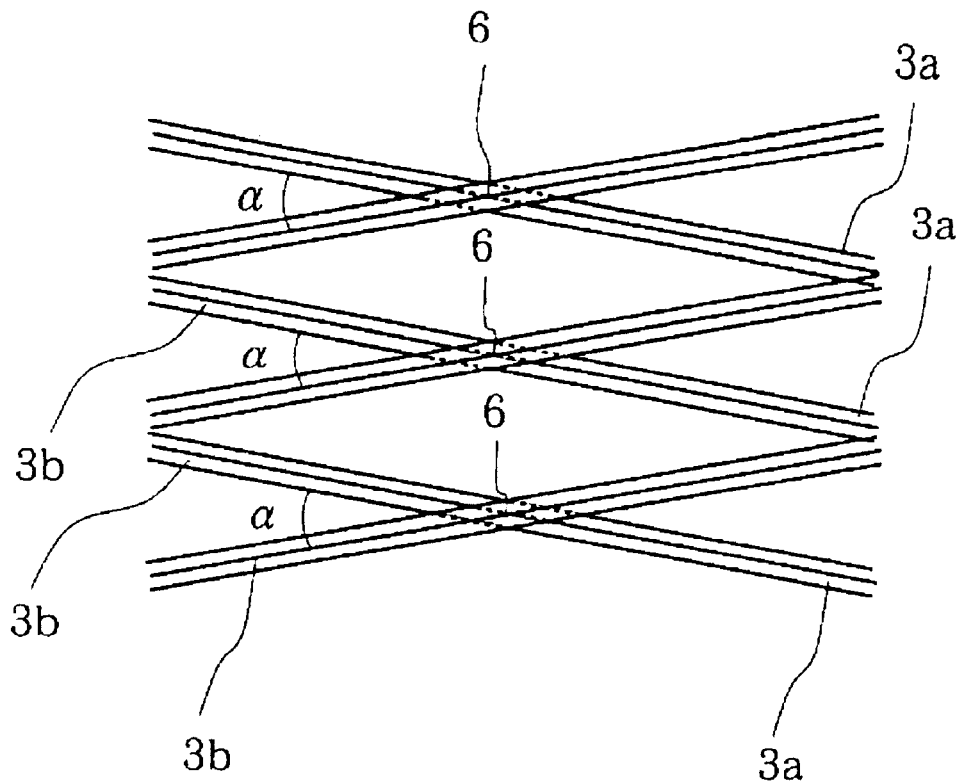
FIG. 6 is a view showing crossing of first line elements and second line elements.

Thus, first line elements 3a which extend in parallel at a predetermined interval in a first direction X on a plane and second line elements 3b which extend in parallel at a predetermined interval in a second direction Y which is different from the first direction X are disposed in such a manner that the first line elements 3a cross the second line elements 3b at a desired angle α and the first and second line elements 3a and 3b are laid one upon the other as shown in FIG. 6.

Figure 7:
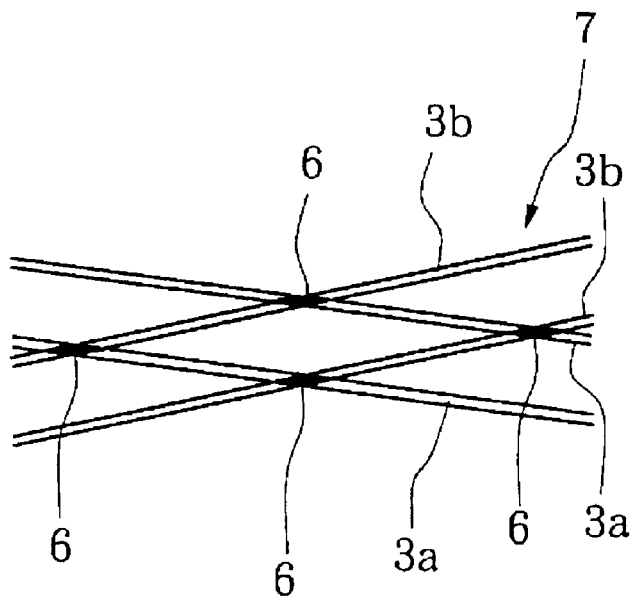
FIG. 7 is a view showing fixing of the first line elements and the second line elements together.

(2) Step of Fixing the First Line Elements to the Second Line Elements at Respective Crossing Points The first line element 3a and the second line elements 3b thus disposed are spot-welded to each other at respective crossing points 6 by a known spot welding machine as shown in FIG. 7 & and net 7 is formed.

(3) Step of Cutting Off a Net

This net 7 is removed from the line element placing table 4 and cut into a predetermined size.

(4) Step of Forming of an Undulating Net

Figure 8:
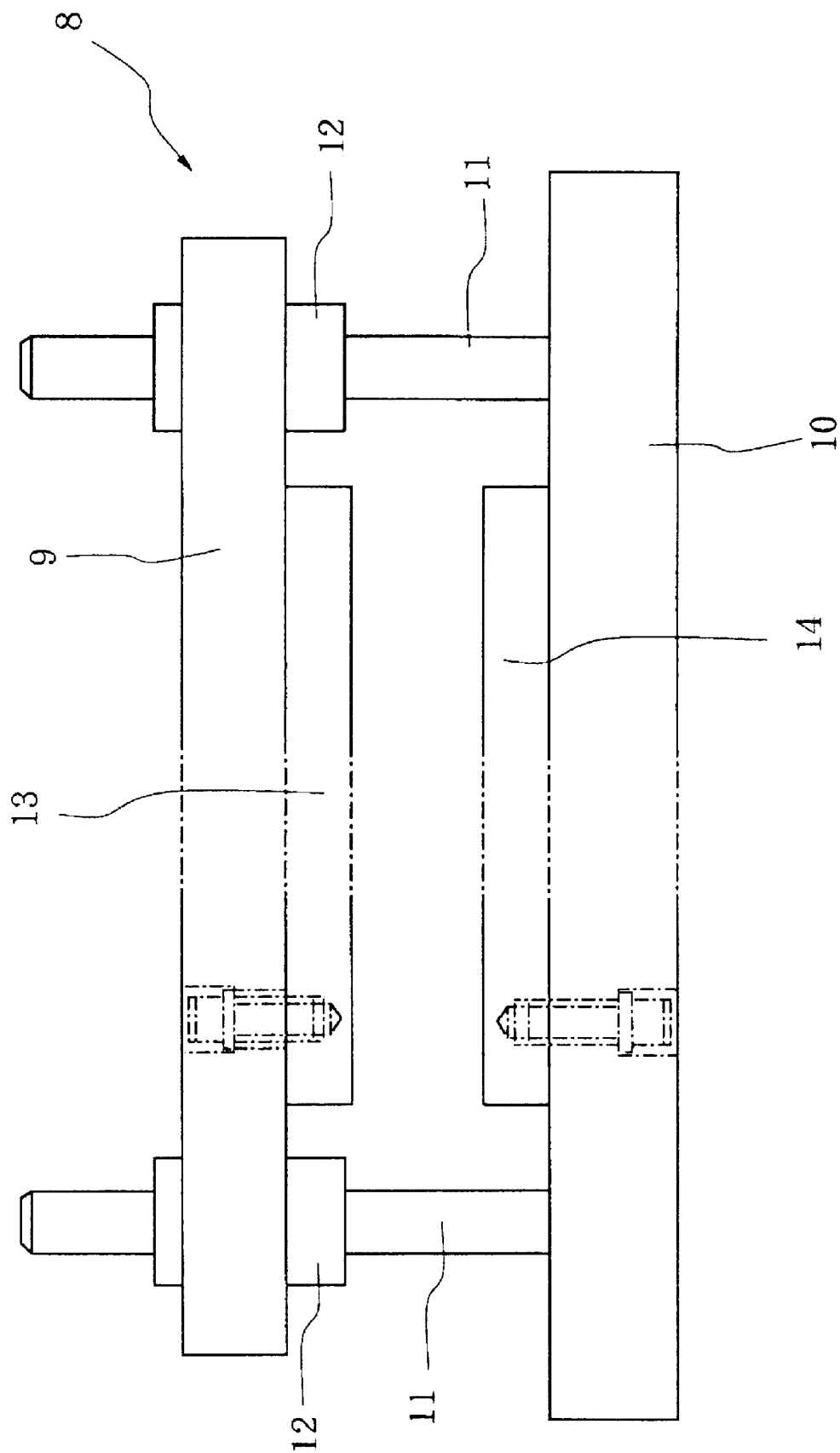
FIG. 8 is a front view of a mold with its central portion being omitted.
Figure 9:
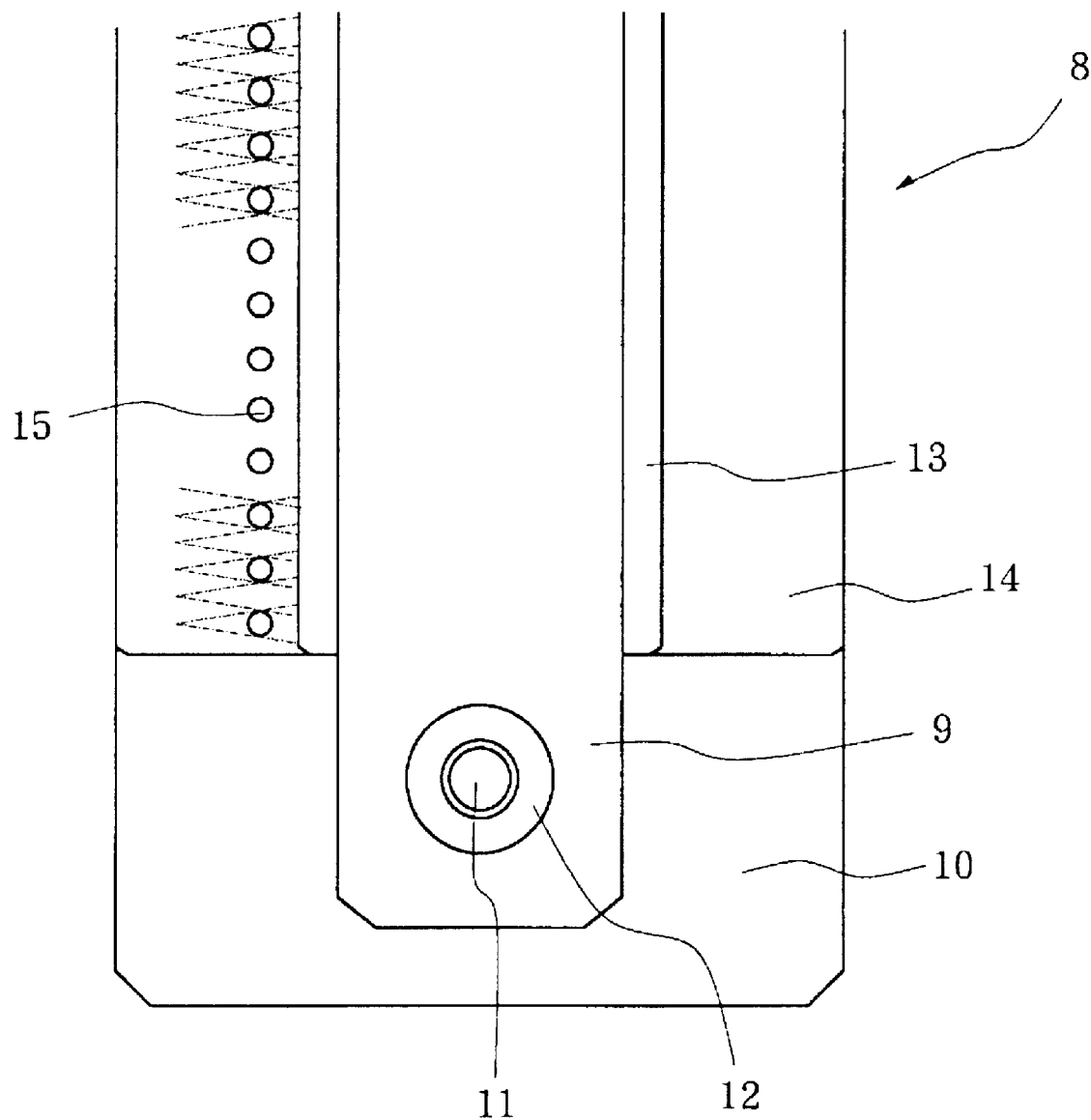
FIG. 9 is a partial plan view of this mold.

Then, the net 7 is pressed by a mold 8 shown in FIGS. 8 to 10 to form an undulating net.

Figure 10A:
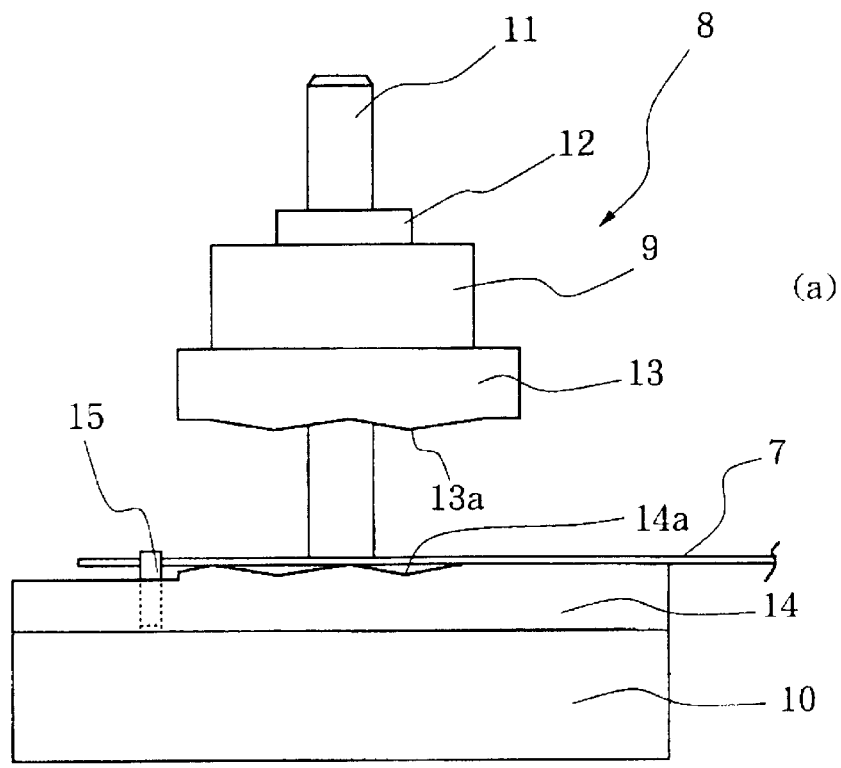
FIG. 10A is a side view of the mold.

FIG. 8 is a front view of the mold 8 with a part thereof being omitted, FIG. 9 is a partial plan view of the mold 8 and FIG. 10A is a side view of the mold 8. In the mold 8, an upper mold table 9 has slide portions 12, 12 which are sidably engaged on a pair of slide shafts 11, 11 erected upwardly from a lower mold table 10 and thereby can slide vertically along the slide shafts 11, 11. The upper mold table 9 has an upper mold 13 fixed thereon and the lower mold table 10 has a lower mold 14 fixed thereon.

The lower mold 14 has a row of positioning pins 15 which are erected ahead of the upper mold 13 in the feeding direction of the net 7. The upper mold 13 and the lower mold 14 are formed on the lower surface of the upper mold 13 and the upper surface of the lower mold 14 with waveforms 13a and 14a which are to be imparted to the undulating net. These waveforms are such that crossing points 6 which are formed continuously in the first direction X and the second direction Y of the net 7 bulge alternately to form parallel undulating bulging portions.

For forming the net 7 to the undulating net, as shown in FIG. 9 and FIG. 10A, the net 7 is first positioned on the lower mold 14 with the upper mold 13 being located above the lower mold 14. The positioning is effected by inserting the positioning pins 15 in rhombic spaces of the net 7 formed by adjacent crossings 6 in the forward end portion of the net 7 in the feeding direction of the net 7.

Figure 10B:
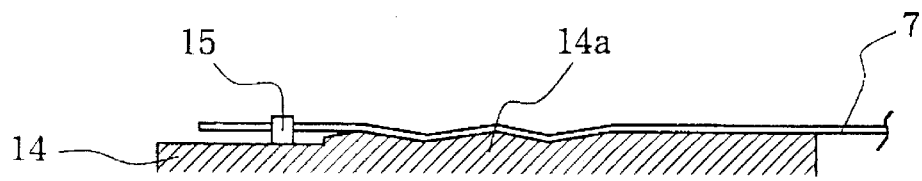
FIGS. 10B to 10D are views showing the process of forming an undulating net by this mold.

Then, manually or by driving the upper mold 13 by a drive unit (not shown), the upper mold 13 is lowered toward the lower mold 14 to press the net 7 between the upper mold 13 and the lower mold 14 and thereby impart the waveform as shown in FIG. 10B.

Figure 10C:
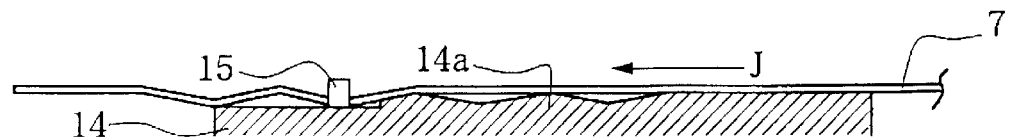

Then, as shown in FIG. 10C, the upper mold 13 is lifted, the net 7 is dieengaged from the positioning pins 15 and fed in the direction of arrow J so as to place a flat portion of the net 7 which has not been imparted with the waveform on the portion of the lower mold 14 having the waveform 14a. The net 7 is positioned again by inserting the positioning pins 15 in the rear end portion of the portion of the net 7 in which the waveform has been imparted.

Figure 10D:
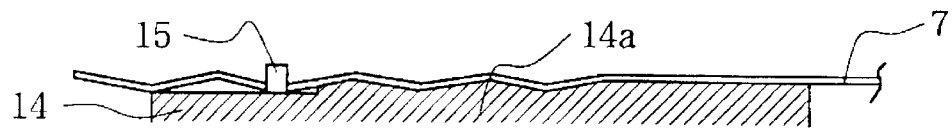
Figure 11A:
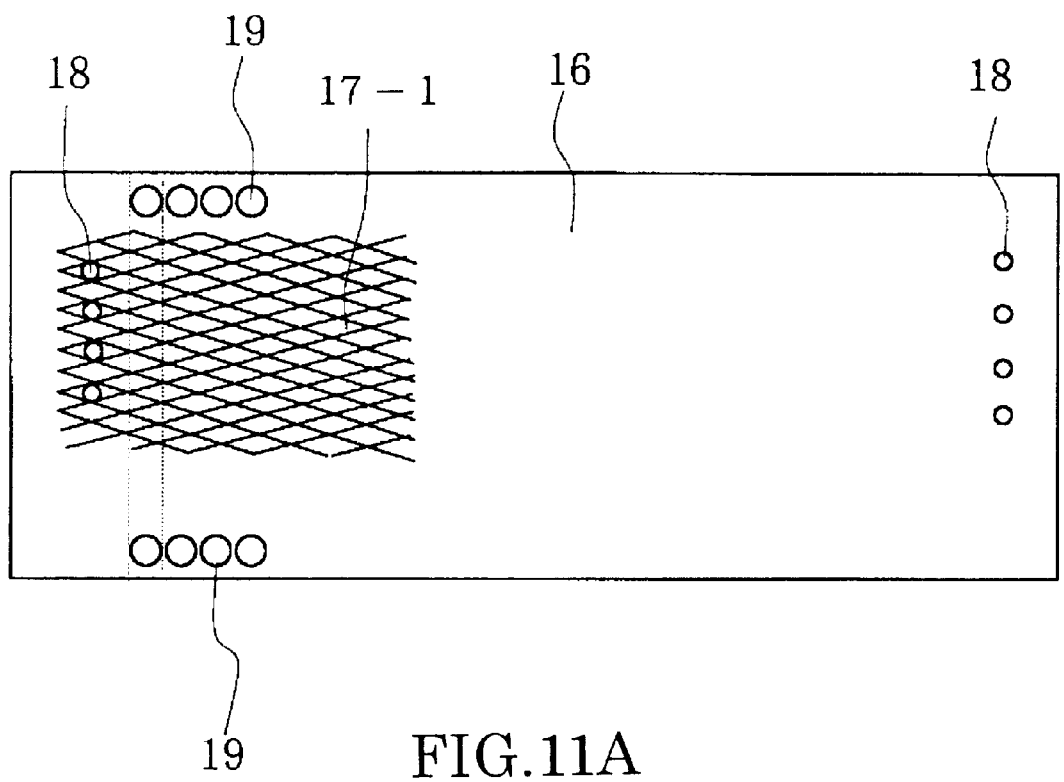
FIG. 11A is a plan view of a laying table for laying undulating nets one upon another.
Figure 11B:
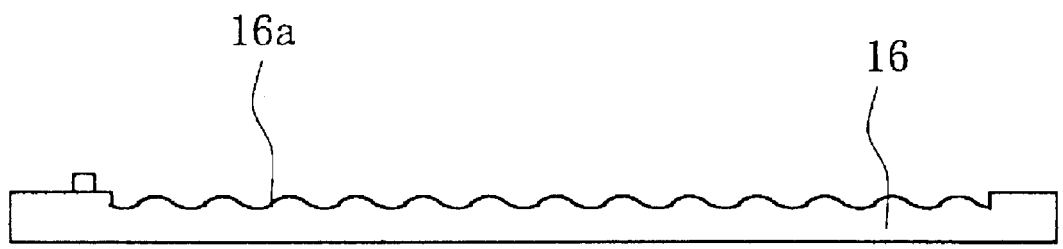
FIG. 11B is a side view of the laying table.

Then, as shown in FIG. 10D, the upper mold 13 is lowered again to press the net 7 and thereby impart the waveform to the net 7.

By repeating the above described operations, parallel undulating bulging portions in which the crossing points 6 formed continuously in the first direction X and the second direction Y bulge alternately are sequentially formed and the undulating net thereby is produced.

Figure 12:
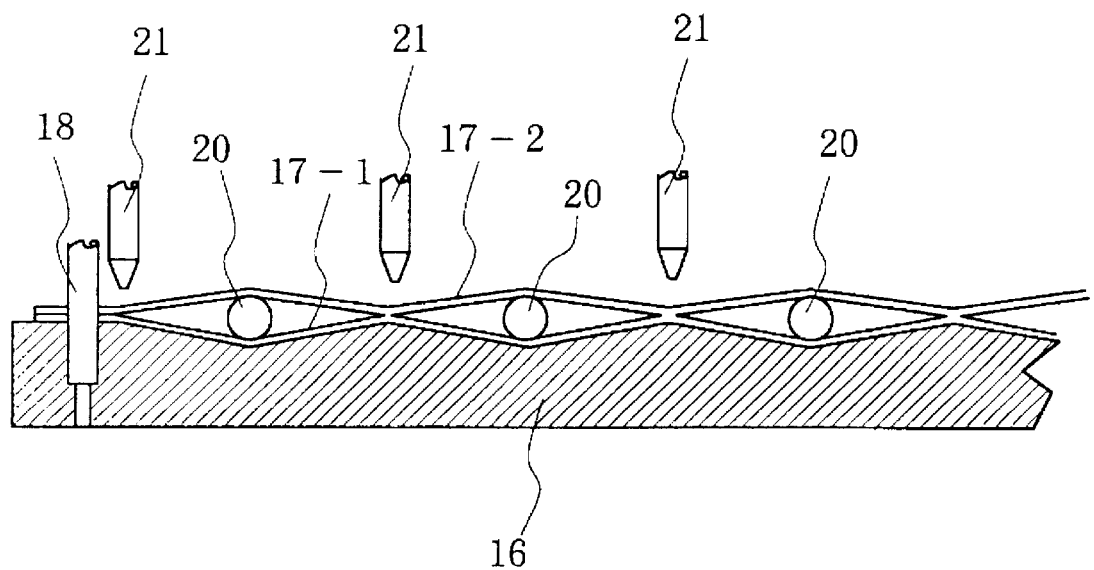
FIG. 12 is a side view of the laying table showing laying of a second undulating net on a first undulating net.
Figure 13:
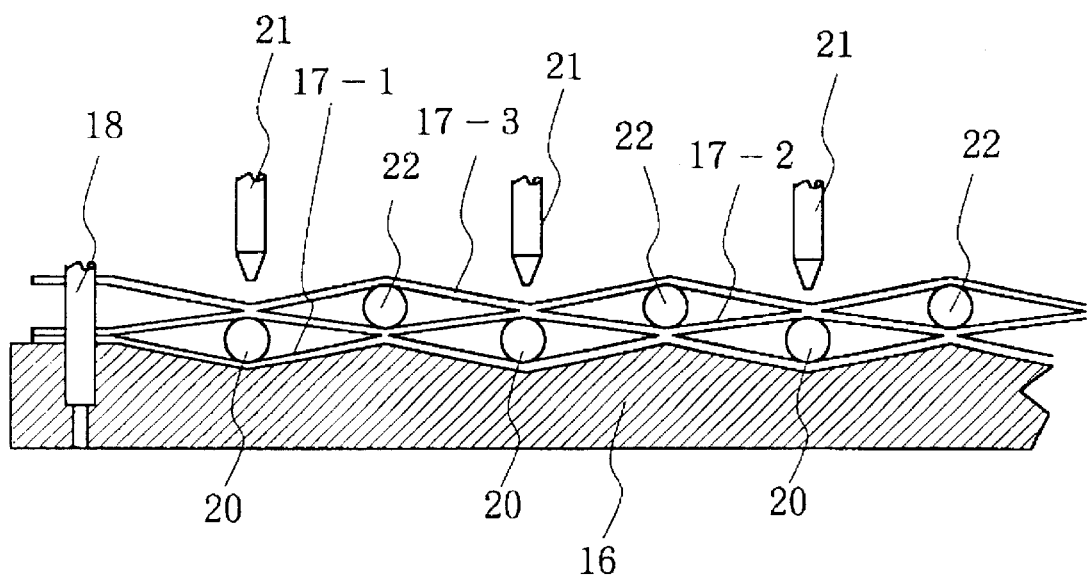
FIG. 13 is a side view of the laying table showing laying of a third undulating net on the second undulating net.
Figure 23:
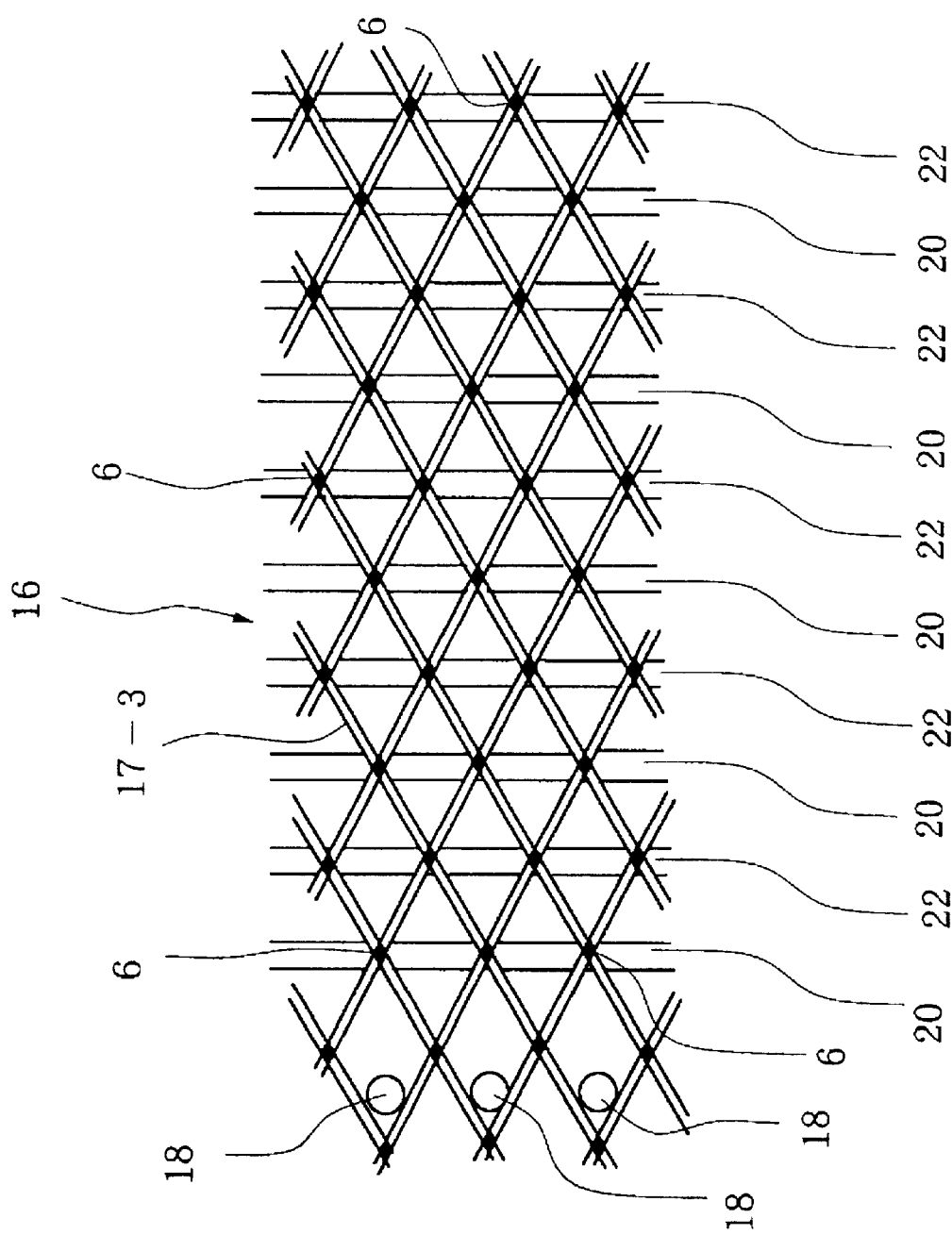
FIG. 23 is a partial plan view showing laying state of FIG. 13.

(5) Step of Laying of the Second Layer of the Undulating Net on the First Layer of the Undulating Net and Fixing of the Two Layers Together Plural layers of the undulating nets thus formed are sequentially laid one upon another on a laying table 16 shown in FIGS. 11 to 13 and FIG. 23. FIG. 11A is a plan view of the laying table 16, FIG. 11B is a side view thereof, FIG. 12 is a partial side section showing a manner of laying a second layer undulating net 17-2 on a first layer undulating net 17-1 and fixing them together, FIG. 13 is a partial side section showing a manner of laying a third layer undulating net 17-2 on the second layer undulating net 17-2 and fixing them together, and FIG. 23 is a partial plan view showing the laying state of FIG. 13.

The laying table 16 is formed on the upper surface thereof with a waveform 16a which is the same as the shape of the parallel undulating bulging portions of the net which are formed by alternate bulging of the crossing points 6 which are formed continuously in the first direction X and the second direction Y. In the left and right end portions as viewed in FIG. 11 of the laying table 16 are provided positioning pins 18 for positioning the undulating net 17. Reference character 19 designates guide pins for holding electrode pins.

In FIGS. 12 and 13, only a part of an electrode 21 of a spot-welding machine is illustrated and illustration of the other portion of the spot-welding machine is omitted.

The first layer undulating net 17-1 is positioned on the laying table 16 in such a manner that the positioning pins 18 are inserted in rhombic spaces formed between adjacent crossing points 6 of the undulating net 17-1 and, as shown in FIG. 12, the waveform of the first layer undulating net 17-1 conforms with the waveform of the laying table 16.

Then, as shown in FIG. 12, electrode pins 20 are disposed in recessed portions of the first layer undulating net 17-1 and then the second layer undulating net 17-2 is laid on the first layer undulating net 17-1 in such a manner that the crossing points which are formed ocontinuously in the first direction X and the second direction Y of the first layer undulating net 17-1 alternately come into contact with and are separated from the crossing points which are formed continuously in the first direction X and the second direction Y of the second layer undulating net 17-2. Then, the crossing points which are in contact with each other of the first layer undulating net 17-1 and the second layer undulating net 17-2 are spot-welded by the spot welding machine 21.

(6) Step of Laying of the Third to n-th Layer Undulating Nets and Fixing Thereof After disposing electrode pins 22 for spot-welding in recessed portions of the second layer undulating net 17-2, the third layer undulating net 17-3 is laid on the second layer undulating net 17-2 in such a manner that the crossing points which are formed ocontinuously in the first direction X and the second direction Y of the second layer undulating net 17-2 alternately come into contact with and are separated from the crossing points which are formed continuously in the first direction X and the second direction Y of the third layer undulating net 17-3. Then, the crossing points which are in contact with each other of the second layer undulating net 17-2 and the third layer undulating net 17-3 are spot-welded. Subsequently, fourth layer, fifth layer, . . . n-th layer (n being any integer) undulating nets are laid in said order in the same manner as described above and crossing points which are in contact with each other between immediately adjacent undulating nets are spot-welded. Thus, the packing 1 made of the three-dimensional net-like structure as shown in FIG. 1 is formed.

Second Embodiment

Step of Forming a First Undulating Net (a) Step of Disposing Line Elements

The same wire as used in the embodiment 1 is used as the line element of the embodiment 2. This line element is disposed over the line element placing table 4 shown in FIG. 5. The manner of disposing the line element is similar to that of the embodiment 1, namely first line elements 3a which extend in parallel at a predetermined interval in a first direction X on a plane and second line elements 3b which extend in parallel at a predetermined interval in a second direction Y which is different from the first direction X are disposed in such a manner that the first line elements 3a cross the second line elements 3b at a desired angle α and the first and second line elements 3a and 3b are laid one upon the other as shown in FIG. 6.

(b) Step of Fixing the First Line Elements to the Second Line Elements at Respective Crossing Points The first line elements 3a and the second line elements 3b thus disposed are spot-welded to each other at respective crossing points 6 by a known spot welding machine as shown in FIG. 7 and a net 7 is thereby formed.

(c) Step of Cutting Off a Net

This net 7 is removed from the line element placing table 4 and cut into a predetermined size.

(d) Step of Forming of an Undulating Net

Then, the net 7 is pressed by a mold 8 to form a first undulating net. This mold 8 is of a construction similar to the mold shown in FIGS. 8 to 10 but the waveforms which are formed on the lower surface of the upper mold and the upper surface of the lower mold are different from those shown in FIGS. 8 to 10. That is, as will be seen in an example of the waveform on the lower mold 24 shown in the side view of FIG. 14, the waveforms are such that crossing points formed continuously in the first direction X and the second direction Y sequentially constitute the lowest level 24a, lower side middle level 24b and upper side middle level 24c.

Figure 14:
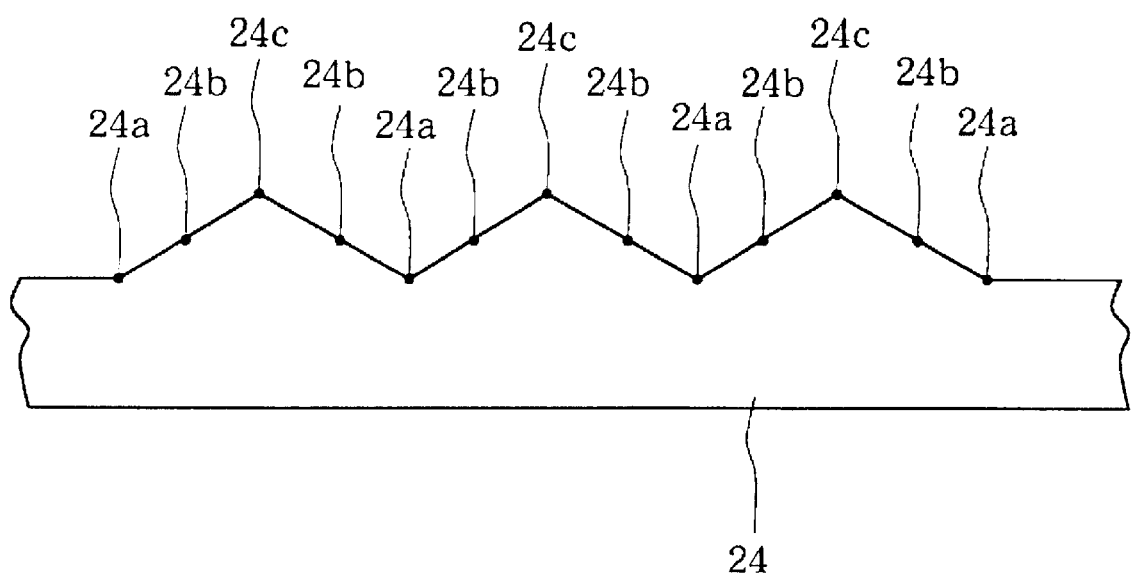
FIG. 14 is a side view of a lower mold of a mold used for a second embodiment of the manufacturing method of the invention.
Figures 15A, 15B:
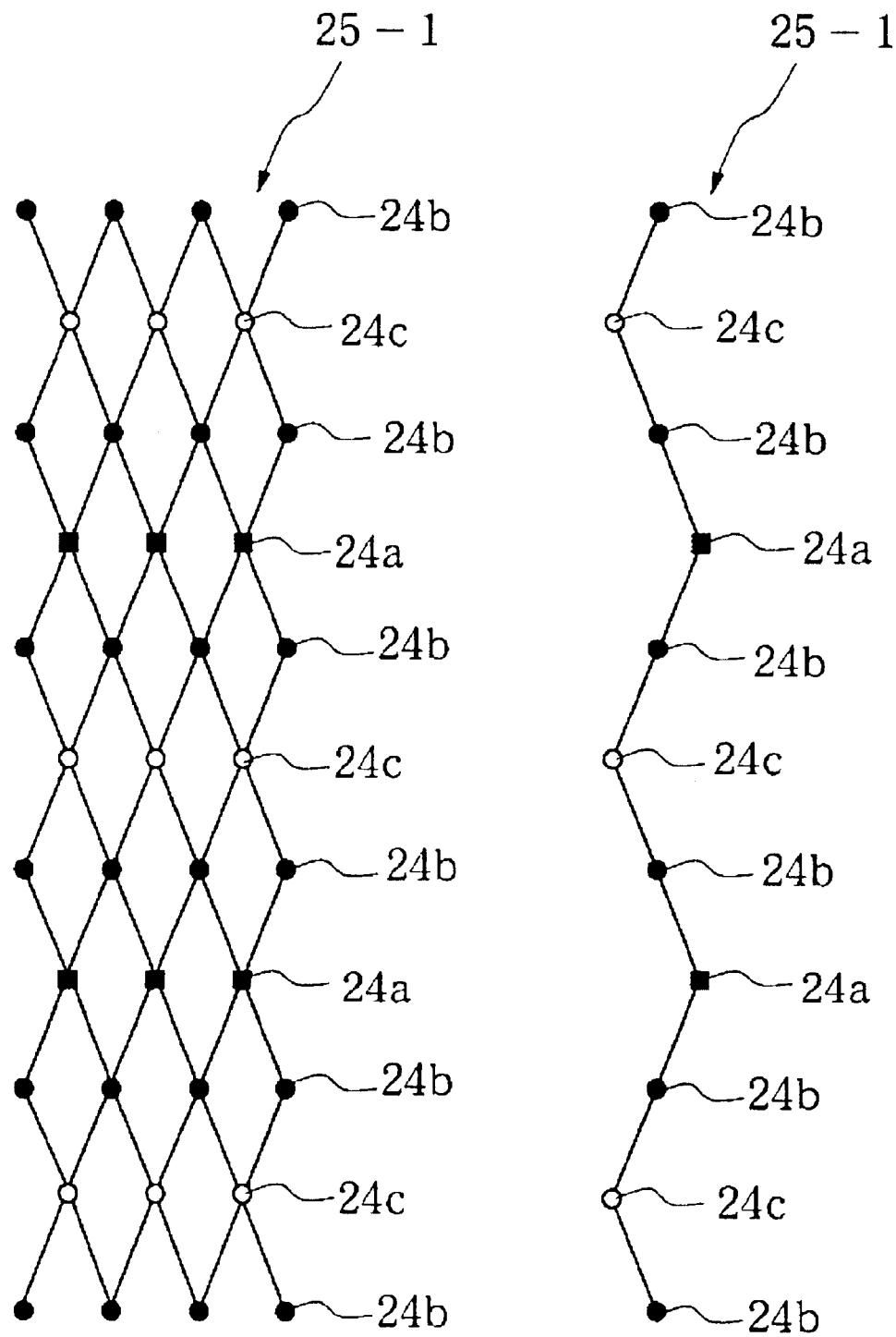
FIG. 15A is a front view of a first undulating net used in the second embodiment.
FIG. 15B is a side view of the first undulating net.

The net 7 is disposed on the lower mold 24 shown in FIG. 14 and the upper mold (not shown) having a waveform which conforms with the the waveform of the lower mold 24 is lowered to press the net 7. Thus, as shown in the partial front view of FIG. 15A and the side view of FIG. 15B, a plurality of parallel undulating bulging portions are formed and thereby a first undulating net 25-1 is formed in such a manner that one of the crossing points continuously formed in the first direction and the second direction constitutes a crossing point 24a (shown by a black square) of the lowest level in forming of a unit three-dimensional net-like structure, a crossing point adjacent to the crossing point 24a of the lowest level constitutes a crossing point 24b (shown by a black circle) of a lower side middle level in forming of the unit three-dimensional net-like structure, a crossing point adjacent to the crossing point 24b of the lower side middle level constitutes a crossing point 24c (shown by a white circle) of an upper side middle level in forming of the unit three-dimensional net-like structure, a crossing point adjacent to the crossing point 24c of the upper side middle level constitutes a crossing point 24b of the lower side middle level in forming of the unit three-dimensional net-like structure, a crossing point adjacent to the crossing point 24b of the lower side middle level constitutes a crossing point 24a of the lowest level in forming of the unit three-dimensional net-like strucuture, and subsequent crossing points constitute crossing points 24a, 24b and 24c of the respective levels in the above cycle in forming of the unit three-dimensional net-like structure.

(2) Step of Forming a Second Undulating Net (a) Step of Disposing Line Elements

Figure 16:
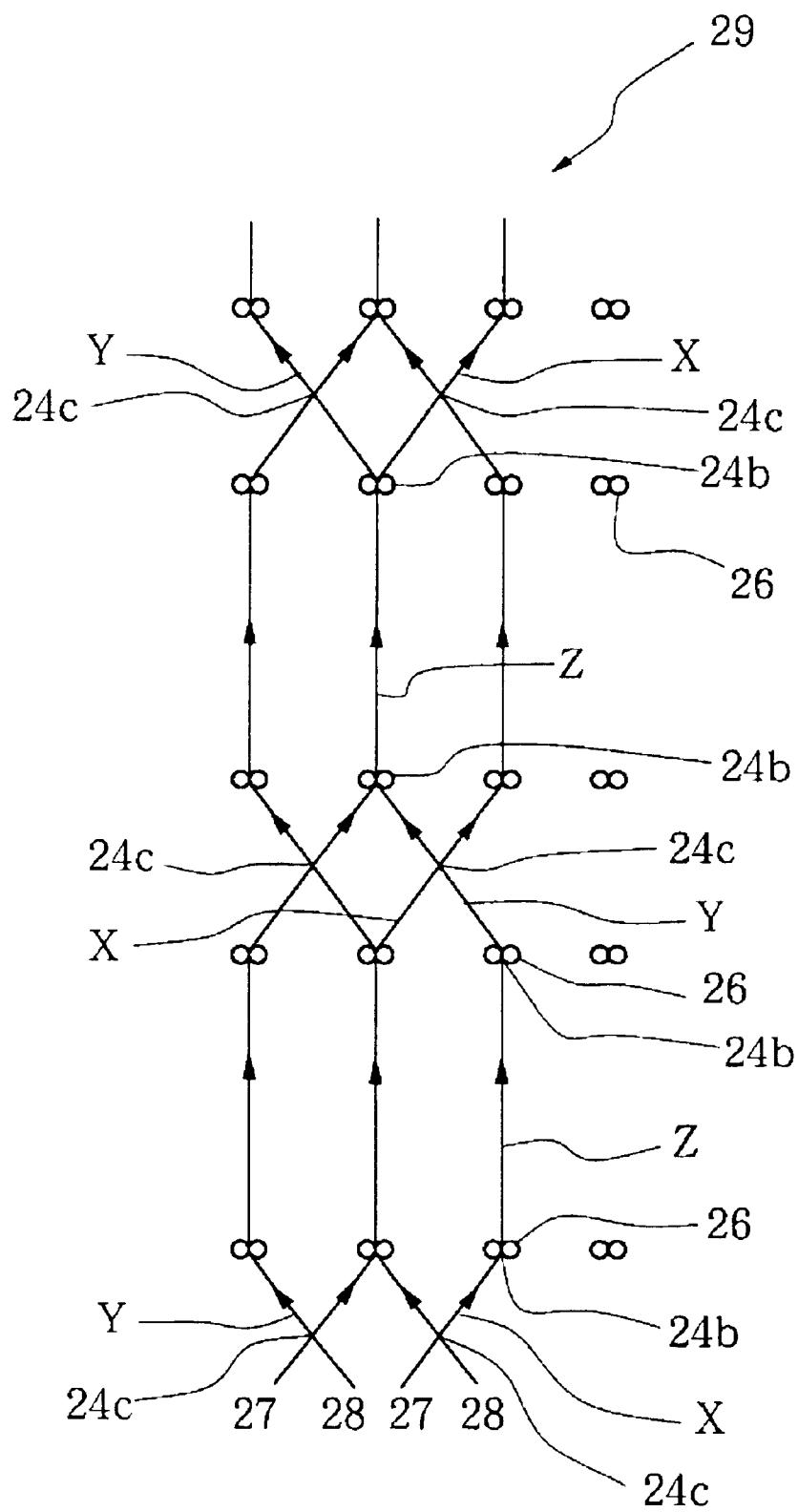
FIG. 16 is a plan view of a line element placing table showing forming of a second undulating net in the second embodiment.

Wire which is of the same structure as the line elements of the first undulating net 25-1 is used as the line element of the second undulating net and this line element is disposed over the line element placing table. This line element placing table is similar to the line element placing table 4 but is different from the line element placing table 4 in that, as shown in FIG. 16, pairs of guide pins 26 for guiding the line elements are provided at a predetermined interval on the table. The line elements are disposed in the following manner.

In FIG. 16, first line elements 27 extend in parallel at a predetermined interval in the first direction X on the line element placing table, bend at a position 24b corresponding to the crossing point 24b of the lower side middle level of the first undulating net 25-1 at a predetermined angle, passing between a pair of guide pins 26 and being guided by them, and extend in a third direction Z. The first line elements 27 then bend at a position 24b corresponding to the next crossing point 24b of the lower side middle point of the first undulating net 25-1 at the predetermined angle, guided by the pair of guide pins 26, and extend in the second direction Y. The first line elements then bend at a position 24b corresponding to the crossing point 24b of the next lower side middle level of the first undulating net 25-1 at the predetermined angle, guided by the pair of guide pins 26, and extend in the third direction Z again. The first line elements then bend at a position 24b corresponding to the crossing point 24b of the next lower side middle level of the first undulating net 25-1 at the predetermined angle and repeat the cycle of extending in the first direction X, the third direction Z, the second direction Y and the third direction Z.

Second line elements 28 extend in parallel at a predetermined interval in the second direction Y on the line element placing table, bend at a position 24b corresponding to the crossing point 24b of the lower side middle level of the first undulating net 25-1 at a predetermined angle, guided by the pair of guide pins 26, and extend in the third direction Z. The second line elements then bend at a position 24b corresponding to the crossing point 24b of the next lower side middle point of the first undulating net 25-1 at the predetermined angle, guided by the pair of guide pins 26, and extend in the first direction X. The second line elements then bend at a position 24b corresponding to the crossing point 24b of the next lower side middle level of the first undulating net 25-1 at the predetermined angle, guided by the pair of guide pins 26, and extend in the third direction Z again. The second line elements then bend at a position 24b corresponding to the crossing point 25b of the next lower side middle level of the first undulating net 25-1 at the predetermined angle, guided by the pair of guide pins 25, and repeat the cycle of extending in the second direction Y, the third direction Z, the first direction X and the third direction Z.

The first line elements 27 and the second line elements 28 are disposed in such a manner that the first line elements 27 and the second line elements 28 cross each other at the desired angle in their portions extending in the first direction X or the second direction Y at positions 24c corresponding to the crossing points 24c of the upper side middle level of the first undulating net 25-1 and extend jointly one being laid upon the other in their portions extending in the third direction Z.

(b) Step of Fixing the First Line Elements to the Second Line Elements

The first line elements 27 are fixed to the second line elements 28 by spot welding at the respective crossing points thereof and also at joining points and separating points of their portions extending in the third direction Z and thereby a net 29 is formed.

(c) Step of Cutting Off of the Net

This net 29 is removed from the line element placing table and cut to a predetermined size.

(d) Step of Forming an Undulating Net

By pressing the net 29 using a mold 8 shown in FIGS. 8 to 10, a plurality of parallel undulating bulging portions which bulge at the respective crossing points and also at middle positions of the portions extending in the third direction Z and thereby constitute the upper side middle level 24c in forming of the unit three-dimensional net-like structure are formed and a second undulating net 25-2 thereby is formed.

Figure 17A:
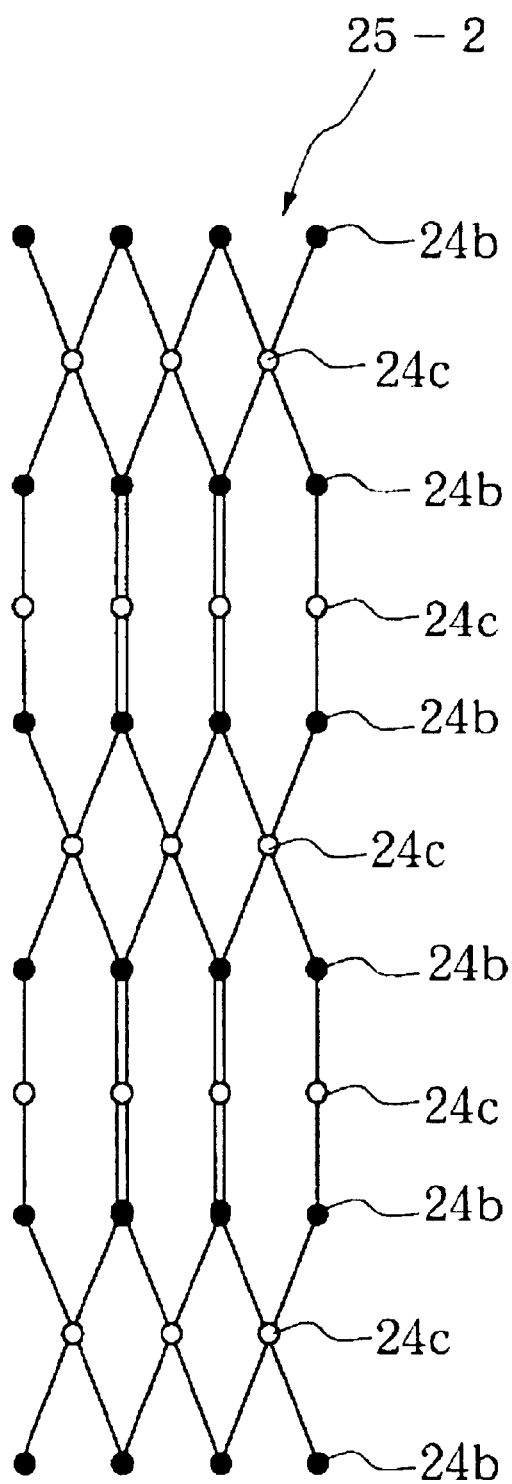
FIG. 17A is a front view of the second undulating net of the second embodiment.
Figure 17B:
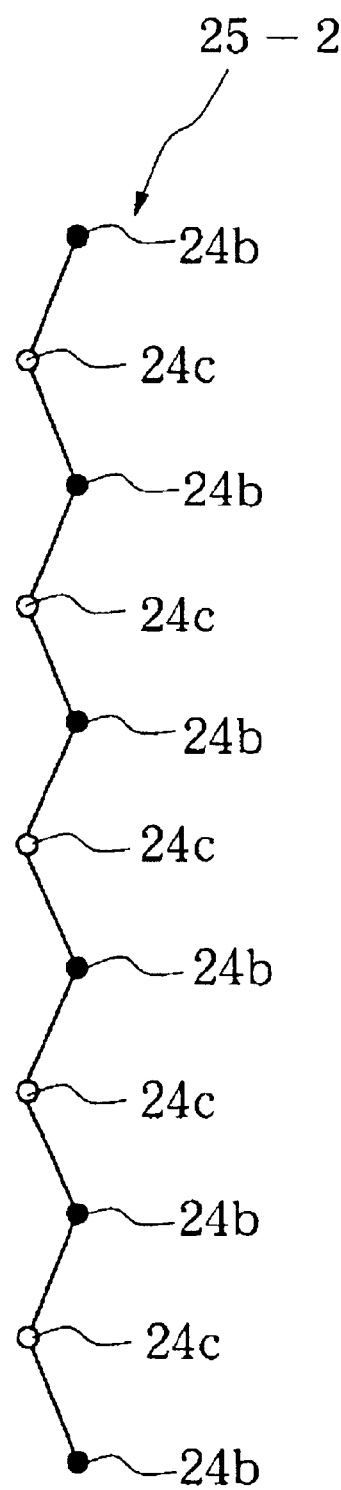
FIG. 17B is a side view of the second undulating net of the second embodiment.

FIG. 17A is a partial front view of this second undulating net 25-2 and FIG. 17B is a side view thereof. In the same manner as in FIG. 15, the white circle in FIGS. 17A and 17B designates the upper side middle level 24c and the black circle the lower side middle level 24b.

In FIG. 16, one of the two joining line elements extending in the direction Z is illustrated on the upper side and the other on the lower side whereas in FIG. 17, the two line elements extending in the direction Z are shown in the state in which the two line elements are disposed in parallel to each other for convenience of illustration.

(3) Step of Forming a Third Undulating Net (a) Step of Disposing Line Elements

Wire which is of the same structure as the line elements of the first and second undulating nets 25-1 and 25-2 is used as the line element of the third undulating net and this line element is disposed on the line element placing table used for forming of the net 29 of the second undulating net 25-2.

Figure 18:
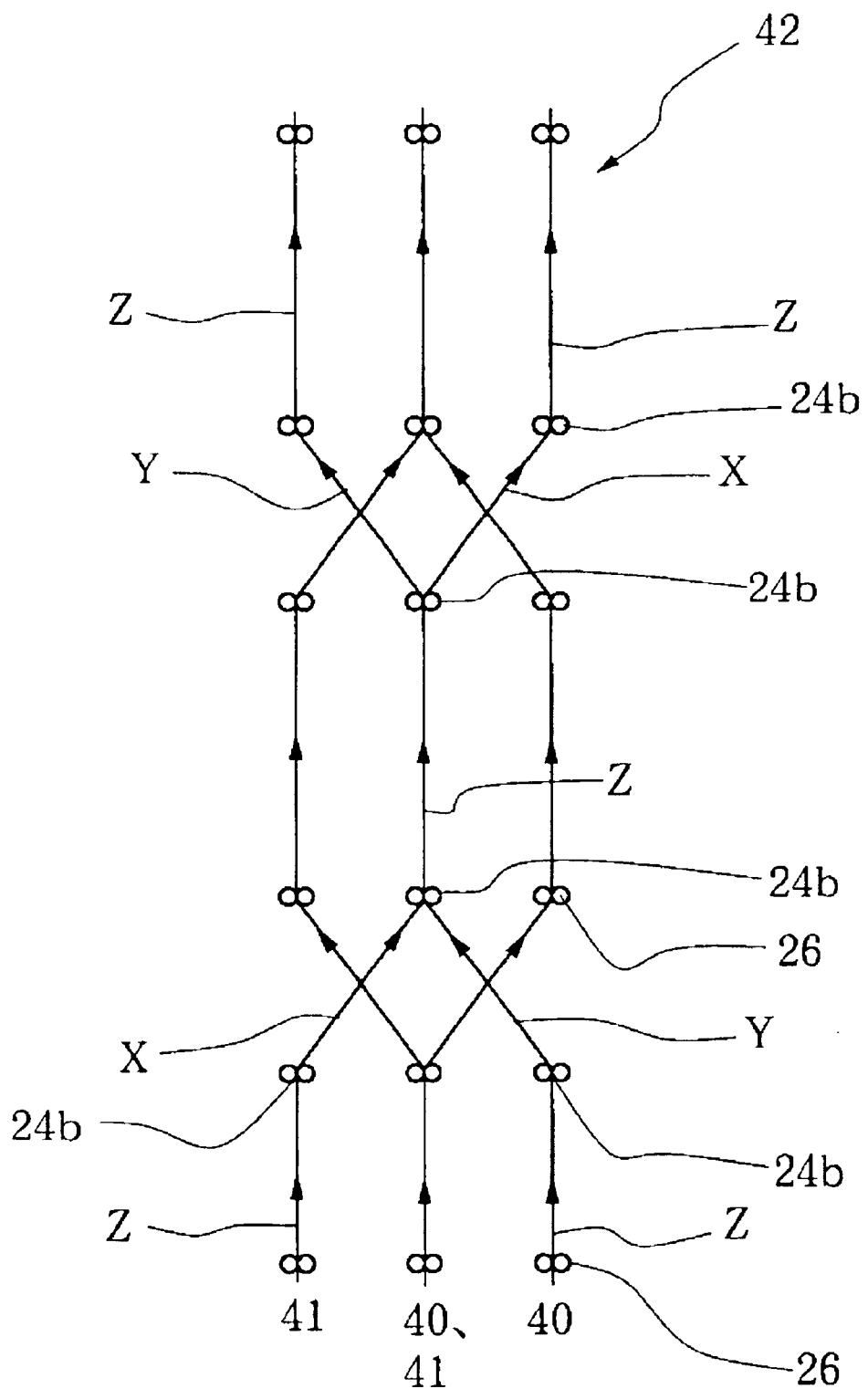
FIG. 18 is a plan view of a line element placing table showing forming of a third undulating net of the second embodiment.

In FIG. 18, first line elements 40 extend in parallel at a predetermined interval in the third direction Z on the line element placing table, bend at a position 24b corresponding to the crossing point 24b of the lower side middle level of the first undulating net 25-1 at a predetermined angle, guided by the pair of guide pins 26, and extend in the second direction Y. The first line element then bend at a position 24b corresponding to the crossing point 24b of the next lower side middle point of the first undulating net 25-1 at the predetermined angle, guided by the pair of guide pins 26, and extend in the third direction Z again. Then the first line elements bend at a position 24b corresponding to the crossing point 24b of the next lower side middle level of the first undulating net 25-1 at the predetermined angle, guided by the pair of guide pins 26, and extend in the first direction X. The first line element then bend at a position 24b corresponding to the crossing point 24b of the next lower side middle level of the first undulating net 25-1 at the predetermined angle and repeat the cycle of extending in the third direction Z, the second direction Y, the third direction Z and the first direction X.

Second line elements 41 extend in parallel at a predetermined interval in the third direction Z on the line element placing table, bend at a position 24b corresponding to the crossing point 24b of the lower side middle level of the first undulating net 25-1 at a predetermined angle and extend in the first direction X. The second line elements then bend at a position 24b corresponding to the crossing point 24b of the next lower side middle point of the first undulating net 25-1 at the predetermined angle and extend in the third direction again Z. The second line elements then bend at a position 24b corresponding to the crossing point 24b of the next lower side middle level of the first undulating net 25-1 at the predetermined angle and extend in the second direction Y The second line elements then bend at a position 24b corresponding to the crossing point 24b of the next lower side middle level of the first undulating net 25-1 at the predetermined angle and repeat the cycle of extending in the third direction Z, first direction X, the third direction Z and the second direction Y.

The first line elements 40 and the second line elements 41 are disposed in such a manner that the first line elements 40 and the second line elements 41 cross each other at the desired angle in their portions extending in the first direction X or second direction Y at positions corresponding to middle positions of the portions extending in the third direction Z of the second undulating net 25-2 and extend jointly one being laid upon the other in their portions extending in the third direction Z.

(b) Step of Fixing the First Line Elements to the Second Line Elements

The first line elements 40 are fixed to the second line elements 41 by spot welding at the crossing points thereof and also at joining points and separating points of their portions extending in the third direction Z and a net 42 thereby is formed.

(c) Step of Cutting Off of the Net

The net 42 is removed from the line element placing table and cut to a predetermined size.

(d) Step of Forming of an Undulating Net

By pressing the net 42 by the mold 8 shown in FIGS. 8 to 10, a plurality of parallel undulating bulging portions which bulge at the respective joining and separating points of the portions extending in the third direction Z and thereby constitute the highest level in forming of the unit three-dimensional net-like structure are formed, and thereby a third undulating net 25-3 is formed.

Figures 19A, 19B:
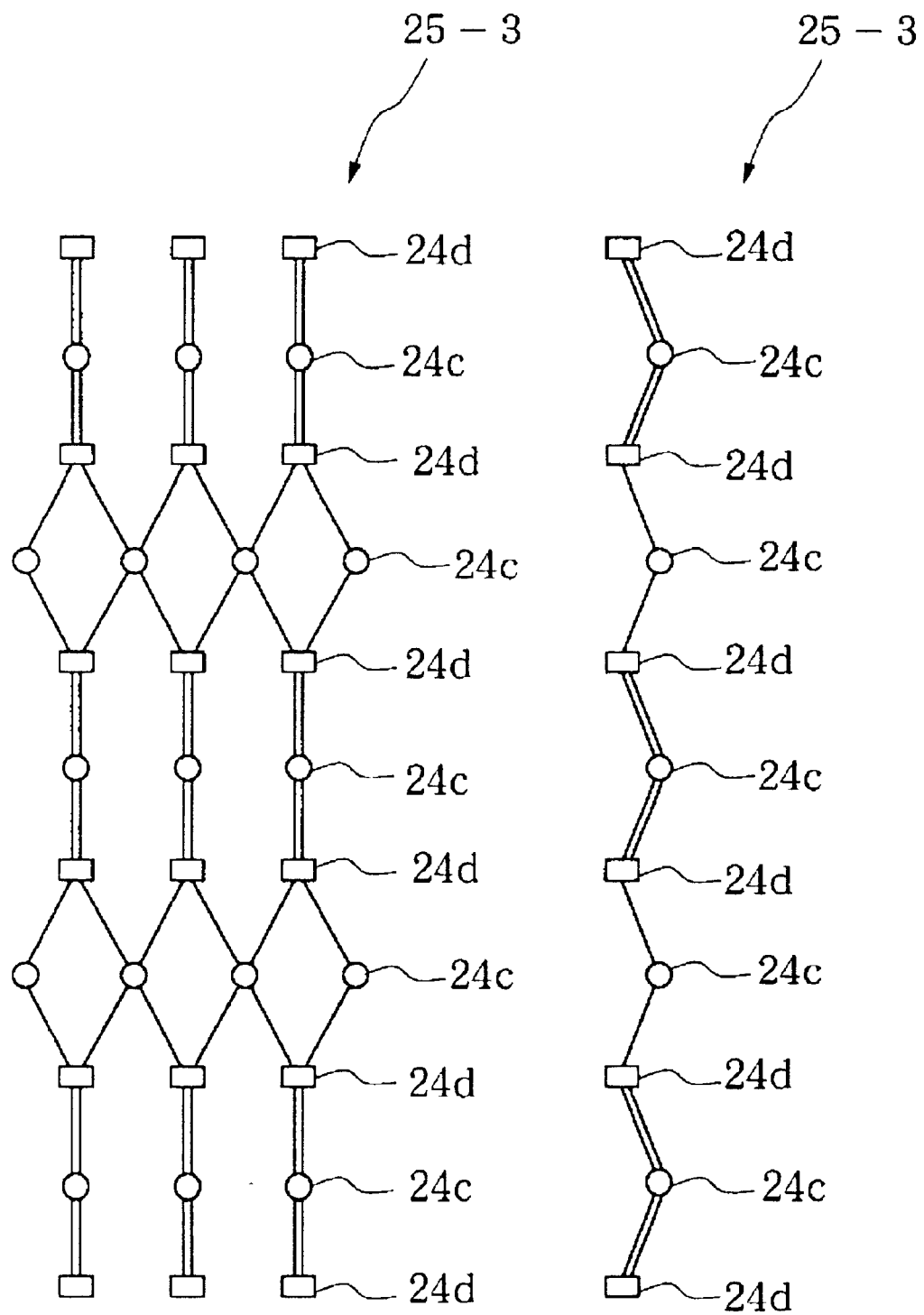
FIG. 19A is a front view of the third undulating net of the second embodiment.
FIG. 19B is a side view of the third undulating net of the second embodiment.

FIG. 19A is a partial front view of the third undulating net 25-3 and FIG. 19B is a side view thereof. In the same manner as in FIGS. 15 and 17, the white circle designates the upper side middle point 24c and the white square the highest level 24d of the unit three-dimensional net-like structure in the forming process.

In FIG. 18, one of the two joining line elements extending in the direction Z is illustrated on the upper side and the other on the lower side whereas in FIG. 19, the two line elements extending in the direction Z are shown in the state in which the two line elements are disposed in parallel to each other for convenience of illustration.

(e) Step of Laying the Second Undulating Net Upon the First Undulating Net

On a laying table which is of a similar construction to the laying table 16 shown in FIG. 11 formed on the entire upper surface thereof with the same waveform as the waveform of FIG. 14, the first undulating net 25-1 is placed in such a manner that its crossing point 24a of the lowest level, crossing points 24b of the lower side middle level and crossing points 24c of the upper side middle level conform with the lowest level, lower side middle level and upper side middle level of the corresponding waveform in the laying table.

Figure 20A:
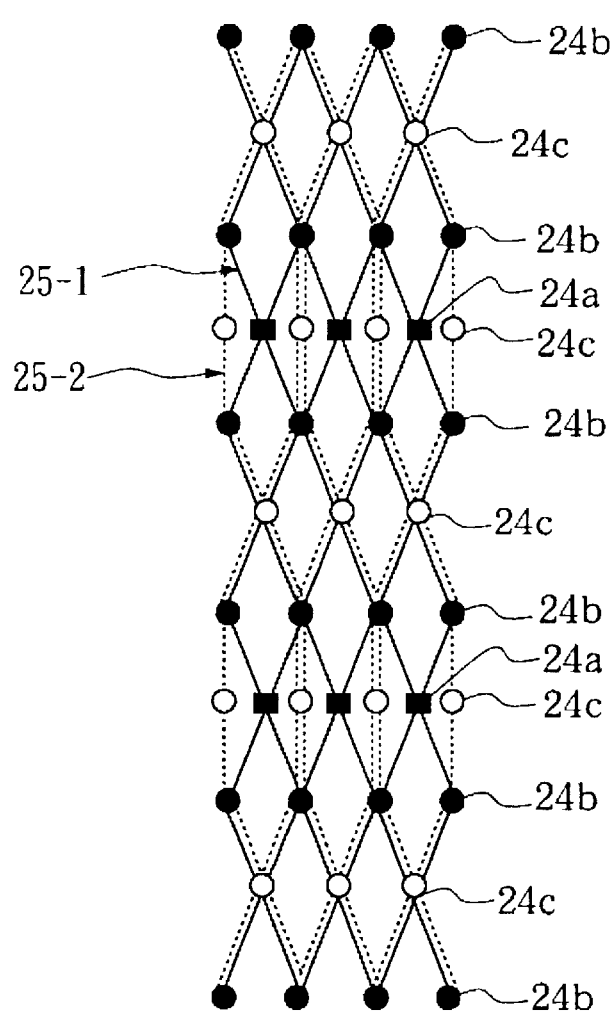
Figure 20B:
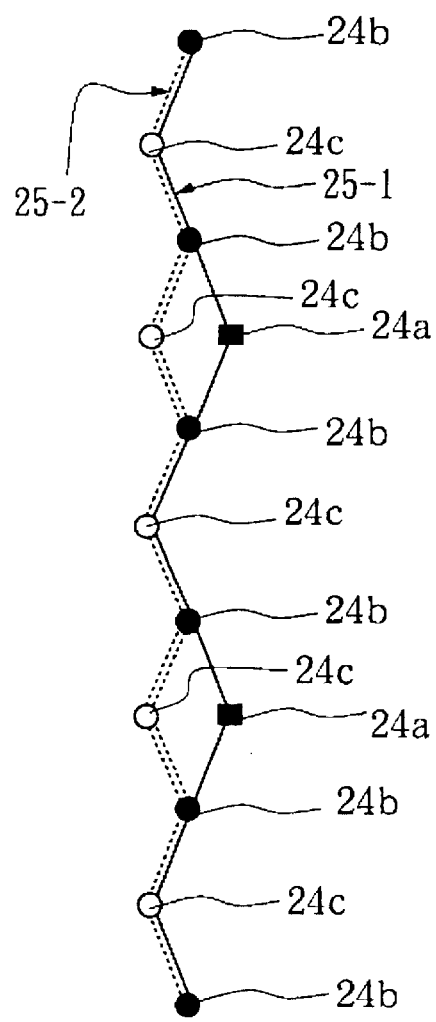

The manner of laying the second undulating net 25-2 on the first undulating net 25-1 is shown in the partial front view of FIG. 20A and the side view of FIG. 20B. In FIGS. 20A and 20B, the undulating net 25-1 is shown by a solid line and the undulating net 25-2 is shown in a broken line.

The second undulating net 25-2 is laid upon the first undulating net 25-1 in such a manner that the crossing points of the second undulating net 25-1 come into contact with the crossing points 24c of the upper side middle level of the first undulating net, 25-1, the joining points and the separating points of the portions extending in the third direction Z of the second undulating net 25-2 come into contact with the crossing points 24b of the lower side middle level of the first undulating net 25-1, and the undulating bulging portions at the middle positions of the portions extending in the third direction Z of the second undulating net 25-2 are separated from the crossing points 24a of the lowest level of the first undulating net 25-1 and form the upper side middle level 24c of the unit three-dimensional net-like structure;

(f) Step of Laying the Third Undulating Net Upon the Second Undulating Net

Figure 21C:
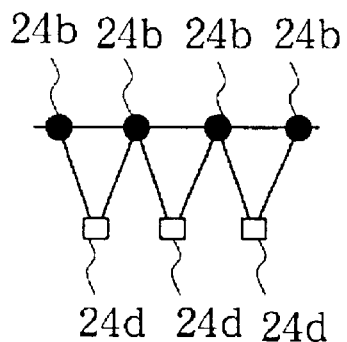
FIG. 21B is a side view thereof and FIG. 21C is a plan view thereof.
Figure 21A:
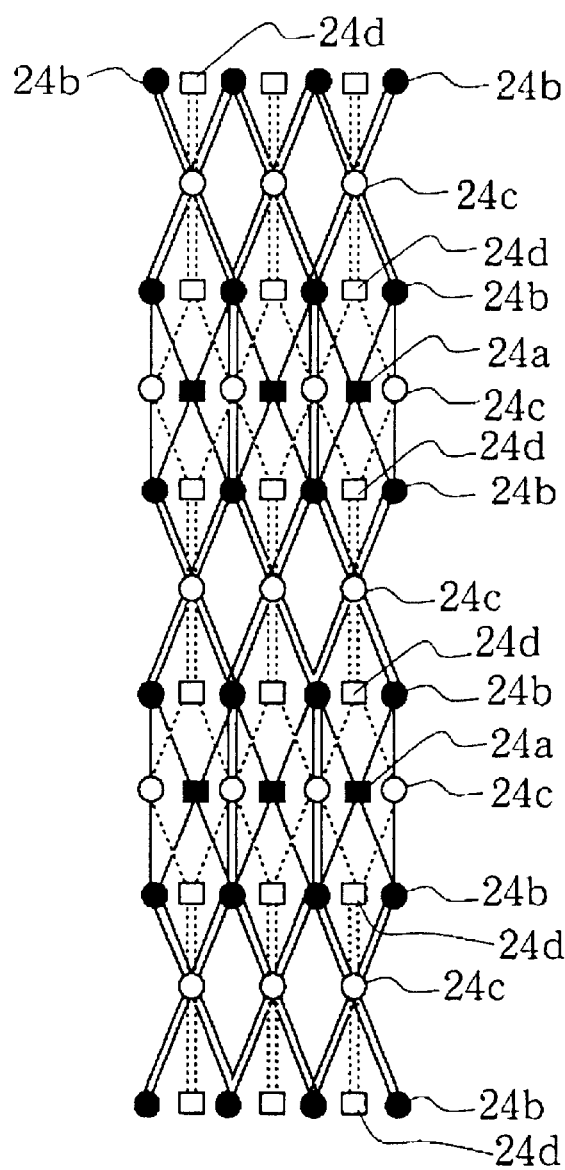
Figure 21B:
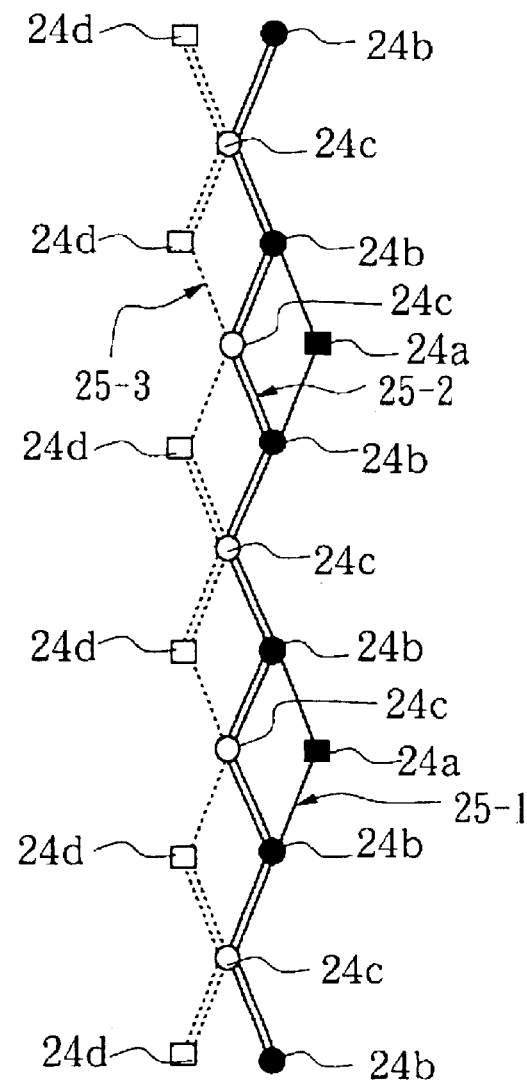
Figure 22:
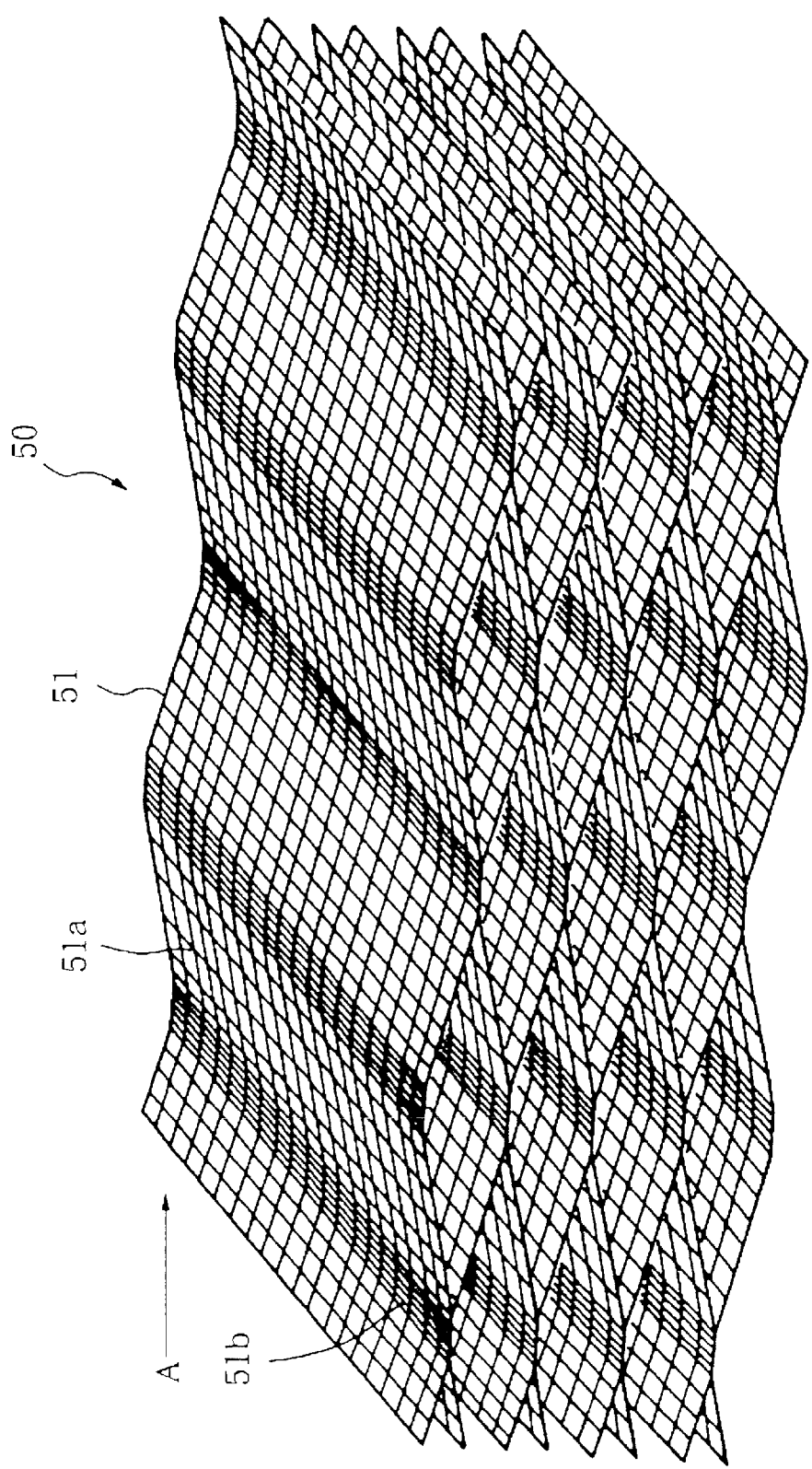
FIG. 22 is a perspective view showing a prior art method for manufacturing an X-packing.

FIG. 21 shows a manner of laying the third undulating net 25-3 upon the second undulating net 25-2. FIG. 21A is a front view thereof, FIG. 21B is a side view thereof and FIG. 21C is a top plan view thereof In FIG. 21, the first undulating net 25-1 and the second undulating net 25-2 are shown by solid lines and the third undulating net 25-3 is shown by a broken line.

The third undulating net 25-3 is laid upon the second undulating net 25-2 in such a manner that the crossing points of the third undulating net 25-3 come into contact with the undulating bulging portions at the middle positions of the portions extending in the third direction Z of the second undulating net 25-2, the portions extending in the third direction Z of the third undulating net 25-3 come into contact, at their middle positions, with the crossing points of the second undulating net 25-2, and the undulating bulging portions at the joining points and the separating points of the portions extending in the third direction Z of the third undulating net 25-3 are separated from the second undulating net 25-2 and form the highest level 24d of the unit three-dimensional net-like structure.

(g) Step of Fixing the First to Third Undulating Nets

The first undulating net 25-1, the second undulating net 25-2 and the third undulating net 25-3 are fixed together at necessary points among points of contact thereof. In FIG. 21, for example, the crossing points 24b of the first undulating net 25-1 and the joining and separating points 24b of the portion extending in the third direction Z of the second undulating net 25-2 are fixed together by spot welding, the crossing points 24c of the second undulating net 25-2 and the middle point 24c of the portion extending in the third direction Z of the third undulating net 25-3 are fixed together by spot welding, and the middle point 24c of the portion extending in the third direction Z of the second undulating net 25-2 and the crossing point 24c of the third undulating net 25-3 are fixed together by spot welding.

Figure 3:
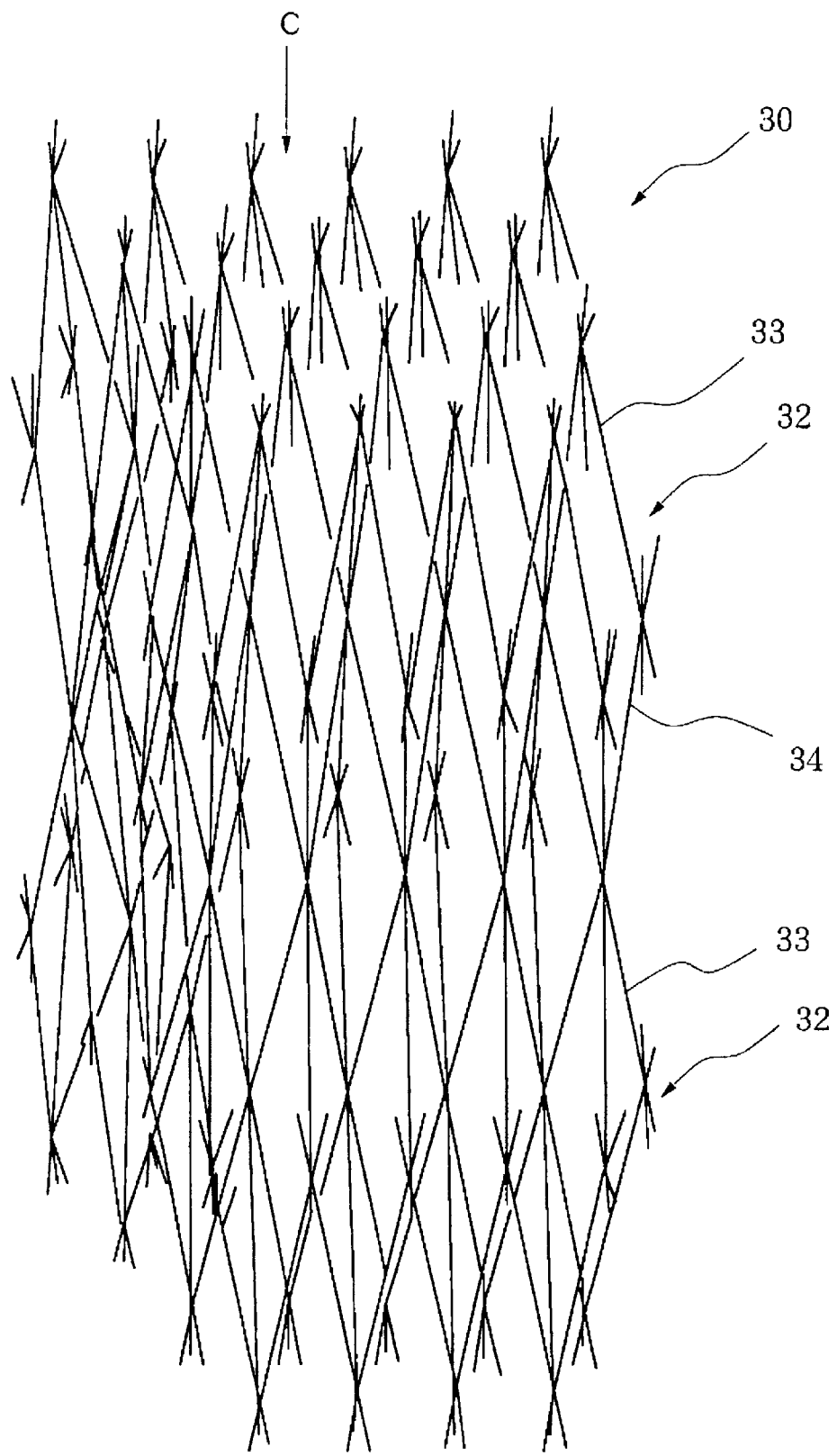
FIG. 3 is a schematic perspective view showing another example of the three-dimensional net-like structure.
Figure 4:
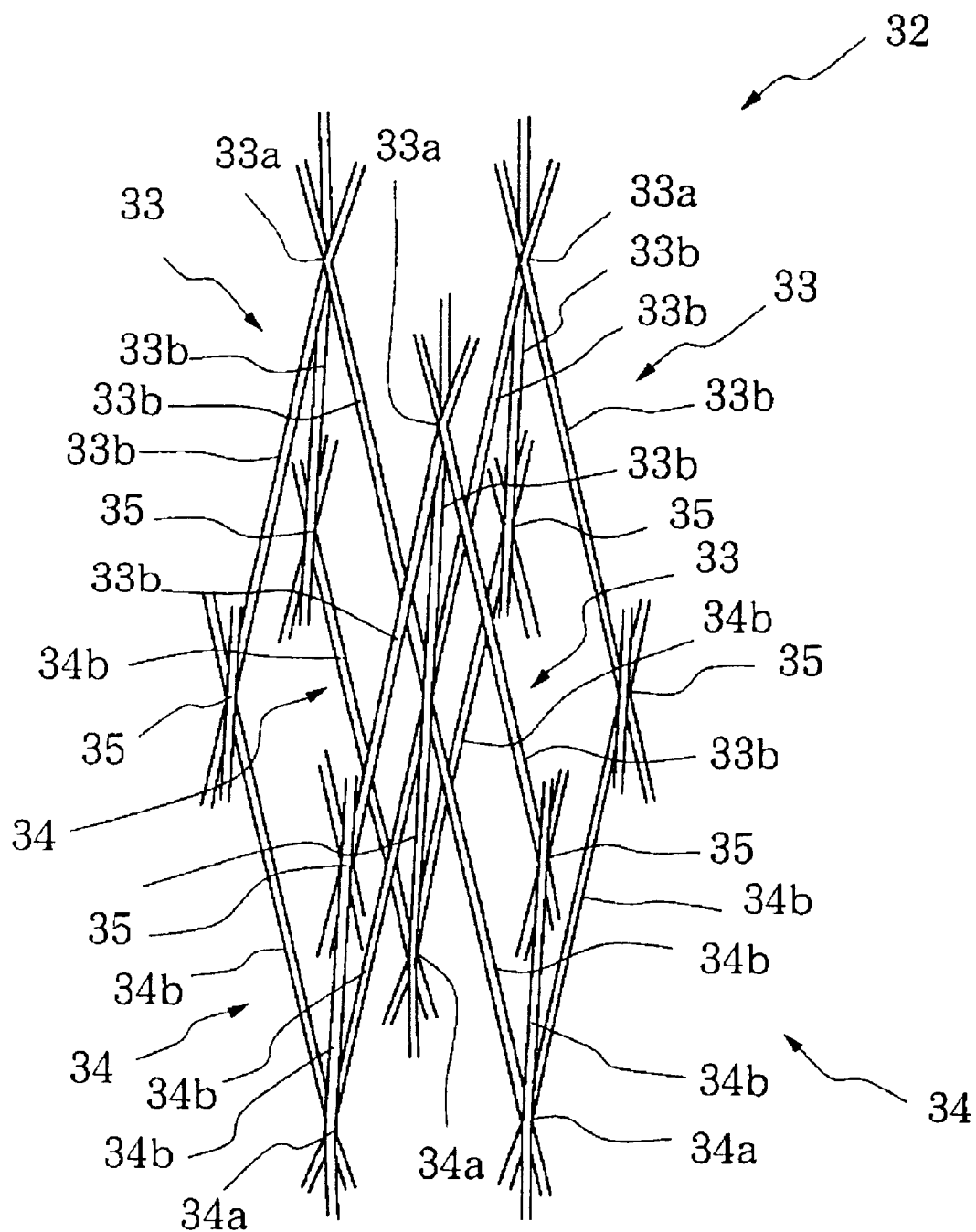
FIG. 4 is a perspective view showing a unit structure of the example.

The structure consisting of the first to third undulating nets are laid in plural layers and welded together to form the three-dimensional net-like structure 30 shown in FIG. 3.

Further, by applying the method of the embodiment 2, a three-dimensional net-like structure having a unit structure consisting of a polygonal pyramids each having an apex consisting of six line elements can be formed.

In the above described embodiments, fixing of the respective line elements and the undulating nets together is performed by spot welding. The invention is not limited to the spot welding but the line elements and undulating nets may be fixed together by other methods such as soldering or, in case the line elements are made of plastic, by heat melting.

What is claimed is:

1. A method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being formed by disposing a plurality of unit structures in vertical and horizontal directions, each of said unit structures being a combination of two quadruple pyramids having a common base and apexes which are directed in opposite directions, said apexes of the two quadruple pyramids and joints of two horizontally adjacent ones of said quadruple pyramids being formed by converging and dispersion of four line elements each of which is made of a wire or twine, and each of said line elements extending from the top of the packing to the bottom of the packing, said method comprising steps of:

(A) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and the first and second line elements are laid one upon the other;

(B) fixing the first line elements to the second line elements at crossing points thereof and thereby forming a net;

(C) pressing the net to form a plurality of parallel undulating bulging portions which bulge at alternate ones of the crossing points continuously formed in the first direction and the second direction and thereby forming an undulating net;

(D) laying a second layer of the undulating net upon a first layer of the undulating net in such a manner that the crossing points continuously formed in the first direction and the second direction of the first layer of the undulating net alternately come into contact with and separate from the crossing points continuously formed in the first direction and the second direction of the second layer of the undulating net and thereafter fixing together the crossing points of the first layer of the undulating net and the second layer of the undulating net which are in contact with each other; and (E) laying a third layer of the undulating net upon the second layer of the undulating net in such a manner that the crossing points continuously formed in the first direction and the second direction of the second layer of the undulating net alternately come into contact with and separate from the crossing points continuously formed in the first direction and the second direction of the third layer of the undulating net and thereafter fixing together the crossing points of the second layer of the undulating net and the third layer of the undulating net which are in contact with each other; and thereafter superposing a fourth, a fifth . . . and n-th, wherein n is any integer, layer of the undulating nets in the same manner and fixing together the crossing points of the respective layers of the undulating nets and the immediately lower layers of the undulating nets which are in contact with each other.

2. A method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being formed by disposing a plurality of unit structures in vertical and horizontal directions, each of said unit structures being a combination of two triangular pyramids having a common base and apexes which are directed in opposite directions, said apexes of the two triangular pyramids and joints of two horizontally adjacent ones of said triangular pyramids being formed by converging and dispersion of three line elements each of which is made of a wire or twine, and each of said line elements extending from the top of the packing to the bottom of the packing, said method comprising:

(A) a step of forming a first undulating net comprising the following steps (a), (b) and (c):

(a) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and are superposed one upon the other;

(b) fixing the first line elements to the second line elements at crossing points thereof and thereby forming a net; and (c) pressing the net to form a plurality of parallel undulating bulging portions and thereby forming a first undulating net in such a manner that one of the crossing points continuously formed in the first direction and the second direction constitutes a crossing point of the lowest level in forming of a unit three-dimensional net-like structure, a crossing point adjacent to the crossing point of the lowest level constitutes a crossing point of a lower side middle level in forming of the unit three-dimensional net-like structure, a crossing point adjacent to the crossing point of the lower side middle level constitutes a crossing point of an upper side middle level in forming of the unit three-dimensional net-like structure, a crossing point adjacent to the crossing point of the upper side middle level constitutes a crossing point of the lower side middle level in forming of the unit three-dimensional net-like structure, a crossing point adjacent to the crossing point of the lower side middle level constitutes a crossing point of the lowest level in forming of the unit three-dimensional net-like structure, and subsequent crossing points constitute crossing points of the respective levels in the above cycle in forming of the unit three-dimensional net-like structure;

(B) a step of forming a second undulating net comprising the following steps (a), (b) and (c):
  (a) disposing
     first line elements extending in parallel at a predetermined interval in the first direction on a plane, bending at a position corresponding to one of the crossing points of the lower side middle level of the first undulating net at a predetermined angle and extending in a third direction, bending at a position corresponding to the next lower side middle point of the first undulating net at the predetermined angle and extending in the second direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the first direction, the third direction, the second direction and the third direction, and
     second line elements extending in parallel at a predetermined interval in the second direction on the plane, bending at a position corresponding to one of the crossing points of the lower side middle level of the first undulating net at a predetermined angle and extending in the third direction, bending at a position corresponding to the next lower side middle point of the first undulating net at the predetermined angle and extending in the first direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the second direction, the third direction, the first direction and the third direction
     in such a manner that the first line elements and the second line elements cross each other at the desired angle in their portions extending in the first or second direction at positions corresponding to the crossing points of the upper side middle level of the first undulating net and extend jointly one being laid upon the other in their portions extending in the third direction;
  (b) fixing the first line elements to the second line elements at the respective crossing points thereof and also at joining points and separating points of their portions extending in the third direction and thereby forming a net; and
  (c) pressing the net to form a plurality of parallel undulating bulging portions which bulge at the respective crossing points and also at middle positions of the portions extending in the third direction and thereby constitute the upper side middle level in forming of the unit three-dimensional net-like structure, and thereby forming a second undulating net;

(C) a step of forming a third undulating net comprising the following steps (a), (b) and (c):
  (a) disposing
     first line elements extending in parallel at a predetermined interval in the third direction on a plane, bending at a position corresponding to one of the crossing points of the lower side middle level of the first undulating net at a predetermined angle and extending in the second direction, bending at a position corresponding to the next lower side middle point of the first undulating net at the predetermined angle and extending in the third direction again, bending at a position corresponding to the next lower side middle level of the first undulating net at the predetermined angle and extending in the first direction, and bending at a position corresponding to the next lower side middle level of the first undulating net at the predetermined angle and repeating the cycle of extending in the third direction, the second direction, the third direction and the first direction, and
     second line elements extending in parallel at a predetermined interval in the third direction on the plane, bending at a position corresponding to one of the crossing points of the lower side middle level of the first undulating net at a predetermined angle and extending in the first direction, bending at a position corresponding to the next lower side middle point of the first undulating net at the predetermined angle and extending in the third direction again, bending at a position corresponding to the next lower side middle level of the first undulating net at the predetermined angle and extending in the second direction, and bending at a position corresponding to the next lower side middle level of the first undulating net at the predetermined angle and repeating the cycle of extending in the third direction, first direction, the third direction and the second direction
     in such a manner that the first line elements and the second line elements cross each other at the desired angle in their portions extending in the first or second direction at positions corresponding to middle positions of the portions extending in the third direction of the second undulating net and extend jointly one being laid upon the other in their portions extending in the third direction;
  (b) fixing the first line elements to the second line elements at the crossing points thereof and also at joining points and separating points of their portions extending in the third direction and thereby forming a net; and
  (c) pressing the net to form a plurality of parallel undulating bulging portions which bulge at the respective joining and separating points of the portions extending in the third direction and thereby constitute the highest level in forming of the unit three-dimensional net-like structure, and thereby forming a third undulating net;

(D) a step of laying the second undulating net upon the first undulating net in such a manner that the crossing points of the second undulating net come into contact with the crossing points of the upper middle level of the first undulating net, the joining points and the separating points of the portions extending in the third direction of the second undulating net come into contact with the crossing points of the lower middle level of the first undulating net, and the undulating bulging portions at the middle positions of the portions extending in the third direction of the second undulating net are separated from the crossing points of the lowest level of the first undulating net and form the upper middle level of the unit three-dimensional net-like structure;

(E) a step of laying the third undulating net upon the second undulating net in such a manner that the crossing points of the third undulating net come into contact with the undulating bulging portions at the middle positions of the portions extending in the third direction of the second undulating net, the portions extending in the third direction of the third undulating net come into contact, at their middle positions, with the crossing points of the second undulating net, and the undulating bulging portions at the joining points and the separating points of the portions extending in the third direction of the third undulating net are separated from the second undulating net and form the highest level of the unit three-dimensional net-like structure; and (F) a step of fixing the first undulating net, the second undulating net and the third undulating net together at necessary points among points of contact thereof.

3. A method for manufacturing a three-dimensional net-like structure including a mist eliminator and a multi-layer filtering film formed by disposing a plurality of unit structures in vertical and horizontal directions, each of said unit structures being a combination of two quadruple pyramids having a common base and apexes which are directed in opposite directions, said apexes of the two quadruple pyramids and joints of two horizontally adjacent ones of said quadruple pyramids being formed by converging and dispersion of four line elements each of which is made of a wire or twine, and each of said line elements extending from the top of the three-dimensional net-like structure to the bottom of the three-dimensional net-like structure, said method comprising steps of:

(A) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and the first and second line elements are laid one upon the other;

(B) fixing the first line elements to the second line elements at crossing points thereof and thereby forming a net;

(C) pressing the net to form a plurality of parallel undulating bulging portions which bulge at alternate ones of the crossing points continuously formed in the first direction and the second direction and thereby forming an undulating net;

(D) laying a second layer of the undulating net upon a first layer of the undulating net in such a manner that the crossing points continuously formed in the first direction and the second direction of the first layer of the undulating net alternately come into contact with and separate from the crossing points continuously formed in the first direction and the second direction of the second layer of the undulating net and thereafter fixing together the crossing points of the first layer of the undulating net and the second layer of the undulating net which are in contact with each other; and (E) laying a third layer of the undulating net upon the second layer of the undulating net in such a manner that the crossing points continuously formed in the first direction and the second direction of the second layer of the undulating net alternately come into contact with and separate from the crossing points continuously formed in the first direction and the second direction of the third layer of the undulating net and thereafter fixing together the crossing points of the second layer of the undulating net and the third layer of the undulating net which are in contact with each other; and thereafter superposing a fourth, a fifth . . . and n-th (n being any integer) layer of the undulating nets in the same manner and fixing together the crossing points of the respective layers of the undulating nets and the immediately lower layers of the undulating nets which are in contact with each other.

4. A method for manufacturing a three-dimensional net-like structure including a mist eliminator and a multi-layer filtering film formed by disposing a plurality of unit structures in vertical and horizontal directions, each of said unit structures being a combination of two triangular pyramids having a common base and apexes which are directed in opposite directions, said apexes of the two triangular pyramids and joints of two horizontally adjacent ones of said triangular pyramids being formed by converging and dispersion of three line elements each of which is made of a wire or twine, and each of said line elements extending from the top of the three-dimensional net-like structure to the bottom of the three-dimensional net-like structure, said method comprising:

(A) a step of forming a first undulating net comprising the following steps (a), (b) and (c):

(a) disposing first line elements extending in parallel at a predetermined interval in a first direction on a plane and second line elements extending in parallel at a predetermined interval in a second direction which is different from the first direction on the same plane in such a manner that the first line elements cross the second line elements at a desired angle and are superposed one upon the other;

(b) fixing the first line elements to the second line elements at crossing points thereof and thereby forming a net; and (c) pressing the net to form a plurality of parallel undulating bulging portions and thereby forming a first undulating net in such a manner that one of the crossing points continuously formed in the first direction and the second direction constitutes a crossing point of the lowest level in forming of a unit three-dimensional net-like structure, a crossing point adjacent to the crossing point of the lowest level constitutes a crossing point of a lower side middle level in forming of the unit three-dimensional net-like structure, a crossing point adjacent to the crossing point of the lower side middle level constitutes a crossing point of an upper side middle level in forming of the unit three-dimensional net-like structure, a crossing point adjacent to the crossing point of the upper side middle level constitutes a crossing point of the lower side middle level in forming of the unit three-dimensional net-like structure, a crossing point adjacent to the crossing point of the lower side middle level constitutes a crossing point of the lowest level in forming of the unit three-dimensional net-like structure, and subsequent crossing points constitute crossing points of the respective levels in the above cycle in forming of the unit three-dimensional net-like structure;

(B) a step of forming a second undulating net comprising the following steps (a), (b) and (c):

(a) disposing first line elements extending in parallel at a predetermined interval in the first direction on a plane, bending at a position corresponding to one of the crossing points of the lower side middle level of the first undulating net at a predetermined angle and extending in a third direction, bending at a position corresponding to the next lower side middle point of the first undulating net at the predetermined angle and extending in the second direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the first direction, the third direction, the second direction and the third direction, and second line elements extending in parallel at a predetermined interval in the second direction on the plane, bending at a position corresponding to one of the crossing points of the lower side middle level of the first undulating net at a predetermined angle and extending in the third direction, bending at a position corresponding to the next lower side middle point of the first undulating net at the predetermined angle and extending in the first direction, bending at a position corresponding to the next lower side middle level of the first undulating net at the predetermined angle and extending in the third direction again, and bending at a position corresponding to the next lower side middle level of the first undulating net at the predetermined angle and repeating the cycle of extending in the second direction, the third direction, the first direction and the third direction in such a manner that the first line elements and the second line elements cross each other at the desired angle in their portions extending in the first or second direction at positions corresponding to the crossing points of the upper side middle level of the first undulating net and extend jointly one being laid upon the other in their portions extending in the third direction;

(b) fixing the first line elements to the second line elements at the respective crossing points thereof and also at joining points and separating points of their portions extending in the third direction and thereby forming a net; and (c) pressing the net to form a plurality of parallel undulating bulging portions which bulge at the respective crossing points and also at middle positions of the portions extending in the third direction and thereby constitute the upper side middle level in forming of the unit three-dimensional net-like structure, and thereby forming a second undulating net;

(C) a step of forming a third undulating net comprising the following steps (a), (b) and (c):

(a) disposing first line elements extending in parallel at a predetermined interval in the third direction on a plane, bending at a position corresponding to one of the crossing points of the lower side middle level of the first undulating net at a predetermined angle and extending in the second direction, bending at a position corresponding to the next lower side middle point of the first undulating net at the predetermined angle and extending in the third direction again, bending at a position corresponding to the next lower side middle level of the first undulating net at the predetermined angle and extending in the first direction, and bending at a position corresponding to the next lower side middle level of the first undulating net at the predetermined angle and repeating the cycle of extending in the third direction, the second direction, the third direction and the first direction, and second line elements extending in parallel at a predetermined interval in the third direction on the plane, bending at a position corresponding to one of the crossing points of the lower side middle level of the first undulating net at a predetermined angle and extending in the first direction, bending at a position corresponding to the next lower side middle point of the first undulating net at the predetermined angle and extending in the third direction again, bending at a position corresponding to the next lower side middle level of the first undulating net at the predetermined angle and extending in the second direction, and bending at a position corresponding to the next lower side middle level of the first undulating net at the predetermined angle and repeating the cycle of extending in the third direction, first direction, the third direction and the second direction in such a manner that the first line elements and the second line elements cross each other at the desired angle in their portions extending in the first or second direction at positions corresponding to middle positions of the portions extending in the third direction of the second undulating net and extend jointly one being laid upon the other in their portions extending in the third direction;

(b) fixing the first line elements to the second line elements at the crossing points thereof and also at joining points and separating points of their portions extending in the third direction and thereby forming a net; and (c) pressing the net to form a plurality of parallel undulating bulging portions which bulge at the respective joining and separating points of the portions extending in the third direction and thereby constitute the highest level in forming of the unit three-dimensional net-like structure, and thereby forming a third undulating net;

(D) a step of laying the second undulating net upon the first undulating net in such a manner that the crossing points of the second undulating net come into contact with the crossing points of the upper middle level of the first undulating net, the joining points and the separating points of the portions extending in the third direction of the second undulating net come into contact with the crossing points of the lower middle level of the first undulating net, and the undulating bulging portions at the middle positions of the portions extending in the third direction of the second undulating net are separated from the crossing points of the lowest level of the first undulating net and form the upper middle level of the unit three-dimensional net-like structure;

(E) a step of laying the third undulating net upon the second undulating net in such a manner that the crossing points of the third undulating net come into contact with the undulating bulging portions at the middle positions of the portions extending in the third direction of the second undulating net, the portions extending in the third direction of the third undulating net come into contact, at their middle positions, with the crossing points of the second undulating net, and the undulating bulging portions at the joining points and the separating points of the portions extending in the third direction of the third undulating net are separated from the second undulating net and form the highest level of the unit three-dimensional net-like structure; and (F) a step of fixing the first undulating net, the second undulating net and the third undulating net together at necessary points among points of contact thereof.

* * * * *